(12) United States Patent
Poreh

(10) Patent No.: US 12,242,551 B2
(45) Date of Patent: Mar. 4, 2025

(54) SEARCH ENGINE FOR CONTENT SEARCHING

(71) Applicant: Qbeats Inc., New York, NY (US)

(72) Inventor: Illan Poreh, New York, NY (US)

( * ) Notice: Subject to any disclaimer, the term of this patent is extended or adjusted under 35 U.S.C. 154(b) by 0 days.

(21) Appl. No.: 17/510,484

(22) Filed: Oct. 26, 2021

(65) Prior Publication Data

US 2022/0129511 A1  Apr. 28, 2022

Related U.S. Application Data

(60) Provisional application No. 63/105,974, filed on Oct. 27, 2020, provisional application No. 63/105,987, filed on Oct. 27, 2020, provisional application No. 63/105,983, filed on Oct. 27, 2020.

(51) Int. Cl.
*G06F 16/00* (2019.01)
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......................... G06F 16/9535; G06F 16/9538
USPC .................................................. 707/600–899
See application file for complete search history.

(56) References Cited

U.S. PATENT DOCUMENTS

| | | |
|---|---|---|
| 5,675,390 A | 10/1997 | Schindler et al. |
| 5,960,411 A | 9/1999 | Hartman et al. |
| 6,057,872 A | 5/2000 | Candelore |
| D440,970 S | 4/2001 | Henderson et al. |

(Continued)

FOREIGN PATENT DOCUMENTS

| | | |
|---|---|---|
| EP | 0873645 B1 | 11/2004 |
| JP | 2003-308441 A | 10/2003 |

(Continued)

OTHER PUBLICATIONS

International Search Report and Written Opinion in International Patent Application No. PCT/US2015/032085, filed May 21, 2015, Received Sep. 30, 2015.

(Continued)

*Primary Examiner* — Irete F Ehichioya
*Assistant Examiner* — Shirley D Hicks
(74) *Attorney, Agent, or Firm* — Prakash Nama; Global IP Services, PLLC

(57) ABSTRACT

A search engine for searching digital content items has been disclosed herein. The search engine may be utilized by one or more users to perform keywords-based search for retrieving digital content items from the World Wide Web or one or more databases in real time. The search engine includes a search bar for receiving keywords from a user for searching relevant digital content items. The search engine further includes searching modes, such as a value mode, a popularity mode, and an expert mode, that is selectable by the user to perform the search. The search engine further includes privacy modes including a private mode and a public mode. One of the privacy modes is selected by the user to set the user's privacy. The search engine may further execute the search request based on the one or more keywords, the selected searching mode, and the set user's privacy.

19 Claims, 12 Drawing Sheets

(56) References Cited

U.S. PATENT DOCUMENTS

| | | |
|---|---|---|
| 6,411,924 B1 | 6/2002 | de Hita et al. |
| 6,668,256 B1 | 12/2003 | Lynch |
| 6,865,677 B1 | 3/2005 | Echizen et al. |
| 6,912,521 B2 | 6/2005 | Kraft et al. |
| 7,287,218 B1 | 10/2007 | Knotz et al. |
| 7,447,646 B1 | 11/2008 | Agarwal et al. |
| 7,801,824 B1 | 9/2010 | Bryar et al. |
| 8,108,262 B1 | 1/2012 | Thirumalai et al. |
| 8,280,824 B1 | 10/2012 | Vermeulen et al. |
| 8,332,260 B1 | 12/2012 | Mysen et al. |
| D678,904 S | 3/2013 | Phelan |
| D684,186 S | 6/2013 | Phelan |
| D695,763 S | 12/2013 | Tagliabue et al. |
| D696,270 S | 12/2013 | Hyunjung et al. |
| D696,274 S | 12/2013 | Tagliabue et al. |
| 8,645,190 B1 | 2/2014 | Juda et al. |
| 8,732,015 B1 | 5/2014 | Beckerman et al. |
| 8,972,393 B1 | 3/2015 | Killalea et al. |
| D738,388 S | 9/2015 | Rosenberg et al. |
| D741,904 S | 10/2015 | Clement et al. |
| D743,998 S | 11/2015 | Auyeung |
| D744,001 S | 11/2015 | Orr |
| D747,731 S | 1/2016 | Oliveira |
| 9,311,390 B2 | 4/2016 | Higgins |
| 9,317,822 B2 | 4/2016 | Böhm et al. |
| D755,223 S | 5/2016 | Liu et al. |
| D756,383 S | 5/2016 | Makida et al. |
| D757,093 S | 5/2016 | Vonshak et al. |
| 9,342,226 B2 | 5/2016 | Brubaker |
| D759,070 S | 6/2016 | Heeter et al. |
| D760,247 S | 6/2016 | Oyama et al. |
| D760,253 S | 6/2016 | Heeter et al. |
| D763,911 S | 8/2016 | Choi et al. |
| D764,483 S | 8/2016 | Heinrich et al. |
| D766,312 S | 9/2016 | Hedges |
| 9,442,928 B2 | 9/2016 | Szues et al. |
| 9,596,513 B2 | 3/2017 | Narasimhan et al. |
| 9,679,001 B2 | 6/2017 | Kang |
| 9,792,658 B1 | 10/2017 | Vijendra et al. |
| 11,062,336 B2 | 7/2021 | Poreh et al. |
| 11,244,412 B1 * | 2/2022 | Phillips ............... G06Q 30/0641 |
| 11,756,064 B2 | 9/2023 | Poreh et al. |
| 2001/0049648 A1 | 12/2001 | Naylor et al. |
| 2002/0004751 A1 | 1/2002 | Seki et al. |
| 2002/0099596 A1 | 7/2002 | Geraghty |
| 2003/0046684 A1 | 3/2003 | Weatherford |
| 2003/0101449 A1 | 5/2003 | Bentolila et al. |
| 2004/0015386 A1 | 1/2004 | Abe et al. |
| 2004/0064374 A1 | 4/2004 | Cho |
| 2005/0027700 A1 | 2/2005 | Turner et al. |
| 2005/0125364 A1 | 7/2005 | Edmondson et al. |
| 2005/0246321 A1 | 11/2005 | Mahadevan et al. |
| 2006/0020596 A1 | 1/2006 | Liu et al. |
| 2006/0143133 A1 | 6/2006 | Medvinsky |
| 2006/0282336 A1 | 12/2006 | Huang |
| 2007/0038567 A1 | 2/2007 | Allaire et al. |
| 2007/0038931 A1 | 2/2007 | Allaire et al. |
| 2007/0043615 A1 | 2/2007 | Dahleh et al. |
| 2007/0061363 A1 | 3/2007 | Ramer et al. |
| 2007/0203945 A1 | 8/2007 | Louw |
| 2008/0027827 A1 | 1/2008 | Eglen et al. |
| 2008/0154798 A1 | 6/2008 | Valz |
| 2008/0215507 A1 | 9/2008 | Eglen et al. |
| 2008/0263038 A1 | 10/2008 | Judge et al. |
| 2008/0263439 A1 | 10/2008 | Oz |
| 2008/0270309 A1 | 10/2008 | Brotman et al. |
| 2008/0307320 A1 | 12/2008 | Payne et al. |
| 2009/0076869 A1 | 3/2009 | Tazartes et al. |
| 2009/0099902 A1 | 4/2009 | Chatter et al. |
| 2009/0106730 A1 | 4/2009 | Mockford |
| 2009/0178073 A1 | 7/2009 | Tsuria et al. |
| 2009/0228379 A1 | 9/2009 | Honts et al. |
| 2009/0228574 A1 | 9/2009 | Maures |
| 2009/0240665 A1 | 9/2009 | Choi |
| 2009/0248575 A1 | 10/2009 | Dipl. Ing. Proidl et al. |
| 2009/0254409 A1 | 10/2009 | Kozhukh |
| 2009/0254447 A1 | 10/2009 | Blades |
| 2009/0292687 A1 | 11/2009 | Fan et al. |
| 2009/0300547 A1 | 12/2009 | Bates et al. |
| 2010/0017259 A1 | 1/2010 | Luo |
| 2010/0037248 A1 | 2/2010 | Lo et al. |
| 2010/0092095 A1 | 4/2010 | King et al. |
| 2010/0106587 A1 | 4/2010 | Walker et al. |
| 2010/0145814 A1 | 6/2010 | Maghani et al. |
| 2010/0205625 A1 | 8/2010 | Beyabani et al. |
| 2010/0241491 A1 | 9/2010 | Eglen et al. |
| 2010/0268716 A1 | 10/2010 | Degaugue et al. |
| 2011/0055018 A1 | 3/2011 | Valz |
| 2011/0082703 A1 | 4/2011 | Higbie |
| 2011/0082761 A1 | 4/2011 | Eglen et al. |
| 2011/0106807 A1 | 5/2011 | Srihari et al. |
| 2011/0119104 A1 | 5/2011 | Levine et al. |
| 2011/0154174 A1 | 6/2011 | Liu et al. |
| 2011/0161997 A1 | 6/2011 | Rourk |
| 2011/0314051 A1 | 12/2011 | Cavet et al. |
| 2011/0321072 A1 | 12/2011 | Patterson et al. |
| 2012/0137367 A1 | 5/2012 | Dupont et al. |
| 2012/0185892 A1 | 7/2012 | Camplejohn et al. |
| 2012/0238255 A1 | 9/2012 | Ramer et al. |
| 2012/0284290 A1 | 11/2012 | Keebler et al. |
| 2012/0290549 A1 * | 11/2012 | Ickman ................ G06F 16/335 707/706 |
| 2012/0290950 A1 | 11/2012 | Rapaport et al. |
| 2012/0303418 A1 | 11/2012 | Poreh |
| 2012/0331049 A1 | 12/2012 | Deeter et al. |
| 2013/0031487 A1 | 1/2013 | Olsen et al. |
| 2013/0144723 A1 | 6/2013 | Green et al. |
| 2013/0173408 A1 | 7/2013 | Lindblom |
| 2013/0246207 A1 | 9/2013 | Novak et al. |
| 2013/0282596 A1 | 10/2013 | Fleming |
| 2013/0305357 A1 | 11/2013 | Ayyagari et al. |
| 2013/0311181 A1 | 11/2013 | Bachtiger et al. |
| 2014/0130182 A1 | 5/2014 | Yackanich et al. |
| 2014/0344034 A1 | 11/2014 | Goodman et al. |
| 2014/0344186 A1 | 11/2014 | Nadler |
| 2015/0193798 A1 | 7/2015 | Poreh |
| 2015/0206112 A1 | 7/2015 | Poreh |
| 2015/0206160 A1 * | 7/2015 | Poreh .................... G06Q 30/06 705/7.35 |
| 2015/0206161 A1 | 7/2015 | Poreh |
| 2015/0221002 A1 | 8/2015 | Poreh |
| 2015/0227953 A1 | 8/2015 | Poreh |
| 2015/0248222 A1 | 9/2015 | Stickler et al. |
| 2015/0254565 A1 | 9/2015 | Beigman Klebanov et al. |
| 2015/0256675 A1 | 9/2015 | Sri et al. |
| 2015/0294337 A1 | 10/2015 | Poreh |
| 2015/0339692 A1 | 11/2015 | Poreh |
| 2015/0339693 A1 | 11/2015 | Poreh |
| 2015/0346923 A1 | 12/2015 | Conder |
| 2016/0027074 A1 | 1/2016 | Poreh |
| 2016/0117059 A1 | 4/2016 | Folken et al. |
| 2017/0017977 A1 | 1/2017 | Herriger et al. |
| 2017/0124157 A1 * | 5/2017 | Keohane ........... G06F 16/24575 |
| 2017/0177590 A1 | 6/2017 | Akselrud |
| 2017/0255953 A1 | 9/2017 | Poreh et al. |
| 2017/0286934 A1 | 10/2017 | Poreh et al. |
| 2018/0165473 A1 * | 6/2018 | Debickes ................ H04L 63/04 |

FOREIGN PATENT DOCUMENTS

| | | |
|---|---|---|
| JP | 2018032166 A * | 3/2018 |
| KR | 100617858 B1 | 8/2006 |
| WO | 0042555 A1 | 7/2000 |
| WO | 2001039086 A2 | 5/2001 |
| WO | 0210961 A2 | 2/2002 |
| WO | 2011097739 A1 | 8/2011 |
| WO | 2012162387 A1 | 11/2012 |
| WO | 2014026057 A1 | 2/2014 |
| WO | 2014026058 A1 | 2/2014 |
| WO | 2014026059 A2 | 2/2014 |
| WO | 2014026060 A2 | 2/2014 |
| WO | 2014026061 A1 | 2/2014 |
| WO | 2014026062 A2 | 2/2014 |
| WO | 2014026063 A1 | 2/2014 |

(56) References Cited

FOREIGN PATENT DOCUMENTS

| WO | 2014026064 A2 | 2/2014 |
|---|---|---|
| WO | 2015179716 A1 | 11/2015 |
| WO | 2015179717 A1 | 11/2015 |
| WO | 2016015004 A1 | 1/2016 |

OTHER PUBLICATIONS

International Search Report and Written Opinion in International Application No. PCT/US2012/039129, Sep. 24, 2012.
Jagannathan, S. (2003). Pricing considerations for delivering e-content on-demand. (Order No. 3093547, University of California, Santa Barbara). ProQuest Dissertations and Theses, 1-191 pg.
Gibson, O. (Jul. 29, 2002). Media: Pay and display: Would you buy a website clip of madonna in concert? Content providers think so—but do you really trust them with your money? The Guardian.
International Search Report and Written Opinion for International Patent Application No. PCT/US2015/032084, filed May 21, 2015, Received Aug. 31, 2015, 10 pages.
International Search Report and Written Opinion in International Patent Application No. PCT/US2015/042102, filed Jul. 24, 2015, Received Nov. 24, 2015, 11 pages.
Trademark Serial No. 86263848, Apr. 26, 2014 (filing date), (Registrant) Acupic Software Corporation Corporation Bahamas, Trademark Electronic Service System (TESS).
Trademark Registration No. 1758709, Mar. 16, 1993 (registration date), First used in commerce—Nov. 1, 1990, (Registrant) Connecticut Specialty Insurance Group, Inc. Corporation Connecticut, Trademark Electronic Service System (TESS).
Trademark Serial No. 74075783, Jul. 3, 1990 (filing date), (Applicant) Toshiba Ceramics Co., Ltd. Corporation Japan, Trademark Electronic Service System (TESS).
Trademark Registration No. 1584443, Dec. 5, 1989 (registration date), First used in commerce—Nov. 1985, (Registrant) Control Systems, Inc. Corporation Minnesota, Trademark Electronic Service System (TESS).
Trademark Registration No. 1273388, Apr. 10, 1984 (registraion date), First used in commerce—Sep. 15, 1982, (Registrant) Goal Systems International Inc. Corporation Ohio, Trademark Electronic Service System (TESS).
7th Grade Math 2015-2016, posted on Sep. 9, 2015, © 1999-2016 Google (online), [site visited Sep. 13, 2016], Available from Internet, <URL: http://7thgrademath2015-2016.blogspot.com/2015/09/investigation-11-shapes-and-designs.html>.
Elegant Themes I Gallery I Foxy Theme Readme, posted on Apr. 12, 2013, © 2016 Elegant Themes [online], [site visited Jun. 23, 2016]. Available from Internet, <URL: http://www.elegantthemes.com/gallery/foxy/readme.html>.
Trademark Serial No. 87013005, Apr. 25, 2016 (filing date), (Applicant) Qbeats Inc. Corporation Delaware, Trademark Electronic Service System (TESS).
Trademark Registration No. 0737125, Sep. 4, 1962 (registration date), First used in commerce—Oct. 29, 1961, (Registrant) Butler Bin Company Corporation Wisconsin, Trademark Electronic System (TESS).
Jagannathan et al., "A dynamic pricing scheme for e-content at multiple levels-of-service.", Aug. 8, 2003 (Aug. 8, 2003) In: Computer Communications 27. Retrieved on Dec. 11, 2013 (Dec. 11, 2013) from <http://www.nmsl.cs.ucsb.edu/papers/COMCOM-04a.pdf>.
Lobst et al., Are Journals Cost Effective? Subscriptions to Electronic Full Text Versus Pay-Per-View. Lehigh Valley Health Network. Oct. 2009. [Retrieved on: Dec. 15, 2013]. Retrieved from internet: <URL: http://scholarlyworks.lvhn.org/cgi/viewcontent.cgi?article=1022&context=education>.
EBay. eBay Stores: Subscriptions & Fees. eBay. May 2012. [Retrieved on: Dec. 16, 2013]. Retrieved from internet: <URL: http://web.archive.org/web/20120503002057/http://pages.ebay.com/storefronts/subscriptions.html>.
Art of Problem Solving I Community I 2012 AMC 12/AHSME, posted on Feb. 23, 2012, © Mathematical Association of America [online], [site visited Sep. 21, 2016]. Available from Internet, <URL: http://www.artofproblemsolving.com/community/c4876_2012_amc_12ahsme>.
Logo Quiz Game I Levels I Logos Quiz Level 1 Answers, posted on Jan. 31, 2015, no copyright date posted [online], [site visited Sep. 21, 2016]. Available from Internet, <URL: http://logoquizgame-answers.com/level-1/>.
Trademark Registration No. 3669519, Aug. 18, 2009 (registration date), (Registrant) Inducs AG Société anonyme Switzerland, Trademark Electronic Service System (TESS).
Trademark Registration No. 4181386, Nov. 27, 2012 (registration date), First used in commerce—Jun. 15, 2014, ) Registrant) Clarke, Janet DBA Certifiable Derby Training Individual, USA Arizona, Trademark Electronic Service System (TESS).
Trademark Registration No. 3813143, Jul. 6, 2010 (registration date), First used in commerce—Jul. 11, 2009, (Registrant) Abest Products Resourcing Inc. Corporation Taiwan, Trademark Electronic Service System (TESS).
Trademark Serial No. 85265839, Mar. 14, 2011 (filing date), (Applicant) Nucap Industries Inc. Corporation Canada, Trademark Electronic Service System (TESS).
Trademark Registration No. 4450437, Dec. 17, 2013 (registration date), First used in commerce—Jan. 2013, (Registrant) Reservoir Media Management, Inc. Corporation Delaware, Trademark Electronic Service System (TESS).
Cole, James, "Economic Issues of Intellectual Property Rights and Pricing for Digital Information on Computer Networks", San Jose State University, May 1996, pp. 1-109, (Year: 1996).
Papadogiorgaki, Maria, et al., "Two-Level Automatic Adaptation of a Distributed User Profile for Personalized News Content Delivery", International Journal of Digital Multimedia Broadcasting 2008 (2008), 21 pages.

* cited by examiner

SEARCH ENGINE FOR CONTENT SEARCHING

CROSS-REFERENCE TO RELATED APPLICATIONS

This application claims priority to U.S. Provisional Patent Application Ser. No. 63/105,974, entitled "VARIOUS MODES OF CONTENT SEARCHING ON SEARCH ENGINE" and filed Oct. 27, 2020, U.S. Provisional Patent Application Ser. No. 63/105,987, entitled "METHOD AND SYSTEM FOR PROVIDING PRIVACY-BASED CONTENT SEARCHING" and filed Oct. 27, 2020, and U.S. Provisional Patent Application Ser. No. 63/105,983, entitled "METHOD AND SYSTEM FOR GENERATING SEARCH POWER FOR CONTENT SEARCHERS" and filed Oct. 27, 2020, the disclosures of which are incorporated herein by reference in their entireties.

FIELD OF INVENTION

Various embodiments of the disclosure relate generally to search mechanism. More specifically, various embodiments of the disclosure relate to a search engine that allows users to search for content over the Internet.

BACKGROUND

The development of content retrieval systems has predominantly focused on enhancing the overall quality of search results that can be presented to a user based on the user's query. Generally, the quality of search results is measured in terms of precision, recall, or other quantifiable measures of performance. Content retrieval systems, or "search engines" in the context of the Internet and World Wide Web, use a wide variety of techniques to improve the quality and usefulness of the search results. These techniques address every possible aspect of search engine design, from the basic indexing algorithms and document representation, through query analysis and modification, to relevance ranking and result presentation. Thus, to perform one or more operations associated with a search engine, the transfer of information over computer networks has become an increasingly important means. Computer networks have grown over the years from independent and isolated entities established to serve the needs of a single group into vast Internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet. The Internet has emerged as a large community of electronically connected users located around the world who readily and regularly exchange significant amounts of information. The Internet continues to serve its original purposes of providing access to and exchange of information among various entities such as government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information. The Internet has emerged as an attractive new medium for advertisers of information, products, and services to reach the users. However, the World Wide Web is composed of a seemingly limitless number of web pages dispersed across millions of different computer systems all over the world in no discernible organization. Therefore, mechanisms, such as directories and search engines, have been developed to index and search the information available on the web and thereby help the Internet users locate information of interest as and when required. These search services enable the users to search the Internet for a listing of web sites based on a specific topic, product, or service of interest.

Generally, in a web-based search on an Internet search engine, a user enters a search term or query comprising one or more keywords. The search engine processes the one or more keywords to generate, in real time, a listing of web pages that the user may access via a hyperlink. However, many-a-times, these listings of web pages are surrounded by too many advertisements and irrelevant information. Further, the inclusion of advertisements and irrelevant information continues a particular web page when the user clicks on the web page to view the content. These advertisements and irrelevant information may be annoying to many users. Further, the search queries are generally processed by the search engine or a third-party server to determine one or more preferences of the users. These preferences are then used to target the users with the unwanted advertisements. Thus, in a way, privacy of the users, who generally performs the search on the search engine is intervened, which may not be desirable to many users. Further, the search engine accesses and processes the one or more search queries of the users without their consent. In addition to the above limitations, currently, there is no search engine that can compute searching strength of the user based on the user's searching activity on the search engine. Thus, there exists a need for a technical and reliable solution that overcomes the above-mentioned problems, challenges, and short-comings, and provides a new and enhanced search engine that continues to facilitate effective and efficient searching experience to the users.

SUMMARY

It is an object of the present disclosure to provide an Internet search engine. The disclosed search engine may be accessed by one or more users by means of a web or mobile application running on one or more computing devices of the one or more users over a communication network. The disclosed search engine may be utilized by the one or more users to perform one or more keywords-based searching for retrieving one or more digital content items from the World Wide Web or one or more databases in real time.

It is another object of the present disclosure to provide the Internet search engine comprising a plurality of searching modes. Each of the plurality of searching modes may be configured to enable or allow the one or more users to search for the digital content items based on one or more keywords. The plurality of searching modes may include at least a value mode (VM), a popularity mode (PM), and an expert mode (EM).

It is another object of the present disclosure to provide the Internet search engine comprising a channel component that includes one or more channels. Each channel may correspond to a content group associated with the one or more keywords. Further, the content group may be utilized by a user to directly access the preferred digital content items. In one example, the channel component may include the one or more channels that have been previously created by the user based on the one or more keywords according to his or her preferences for one or more types of the digital content items. In another example, the channel component may include the one or more channels that have been automatically created by the search engine based on at least one of the user's searching history or the current trending keywords or content.

It is another object of the present disclosure to provide the Internet search engine comprising a search bar. The search bar may be utilized by the user to input the one or more keywords for searching the digital content items. Based on the one or more keywords, the search engine may generate and present a search result page including the relevant digital content items to the user. The search result page may further include the search bar with the one or more keywords. The search result page may further include the plurality of searching modes. The search bar on the search result page may be integrated with a zoom-in component. The zoom-in component may be enabled or accessed by the user to further refine or limit or narrow down the search results. The zoom-in component may be accessed or selected by the user to open an additional search bar that is integrated on the search bar. The additional search bar may be utilized by the user to provide additional keywords to further narrow down the search result.

It is another object of the present disclosure to provide the Internet search engine comprising a plurality of privacy modes. The plurality of privacy modes may be configured to enable or allow each of the one or more users to set a user's privacy before, during, or after searching of the digital content items on the search engine based on the one or more keywords. The plurality of privacy modes may include at least a private mode and a public mode. Based on the set privacy mode (i.e., a private or public mode), at least one of the searched keywords and one or more related search results are either kept private or made public.

It is another object of the present disclosure to provide the Internet search engine comprising a read what they read (RWTR) component. The RWTR component may be configured to enable or allow a user to read or access at least one of the keywords and the related search results that were searched, read, and/or reviewed by the user's following(s) on the search engine. The RWTR component may include one or more followings of the user. The one or more digital content items of the search results (with or without the searched keywords) may be available to the user when the user's following(s) have performed the search in the public mode on the search engine. The one or more digital content items of the search results (with the searched keywords) may be kept private and are not shared with any other entity when the user's following(s) have performed the search in the private mode on the search engine.

It is another object of the present disclosure to provide the Internet search engine that is configured to determine one or more categories associated with the one or more keywords. The one or more categories may include, but are not limited to, sports, science, technology, society, culture, mathematics, health, finance, entertainment, food, beverages, arts, and politics.

It is another object of the present disclosure to provide the Internet search engine comprising a search power component that is configured to generate a search power for a user based on one or more searching activities of the user on the search engine. The search power may indicate how good the user is in performing the keyword-based search on the search engine. The user may perform the keyword-based search in the one or more categories. In such a case, the search power component may generate the search power (i.e., a proficiency level) for the user in each category based on the one or more searching activities associated with each category.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

The invention is explained in further detail, and by way of example, with reference to the accompanying drawings wherein.

Figure 1:
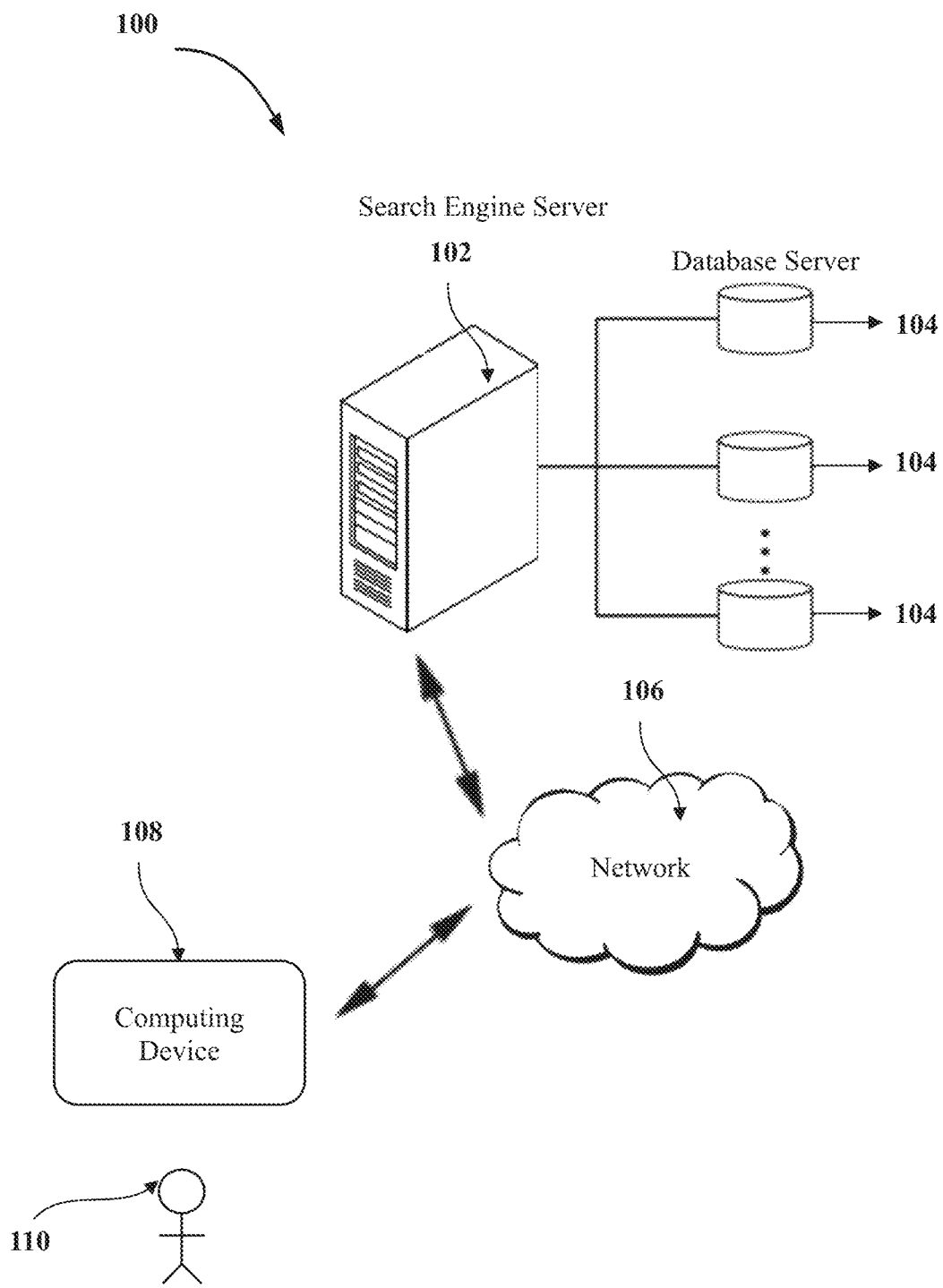
FIG. 1 is a block diagram that illustrates a system environment in which various operations of an Internet search engine are practiced, in accordance with an exemplary embodiment of the present disclosure.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The present invention will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices or a combination thereof. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in an embodiment" or "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" may include singular or plural references. The meaning of "in" includes "in" and "on."

The following is a description of illustrative embodiments that when taken in conjunction with the following drawings will demonstrate the above noted features and advantages, as well as further ones. In the description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

In the below description, the term "search engine" or "Internet search engine" has been used. It is to be understood that this term generally refers to a computer program (supported and executed by a computer server) that returns one or more results in response to a search query provided by a user. The search query may include one or more keywords as preferred by the user to perform the search. The results may include one or more links to one or more web pages. In addition, the search engine may include a "crawler" component that obtains information from the Internet by crawling the web, as well as an "indexer" component that indexes the information obtained by the crawler. The term "search engine" is also intended to include meta-search engines, real-time search engines, index-based search engines, open directory style search engines, directory listing websites, yellow page style websites, and indices.

FIG. 1 is a block diagram that illustrates a system environment 100 in which various operations of an Internet search engine are practiced, in accordance with an exemplary embodiment of the present disclosure. The system environment 100 includes one or more application or computing servers such as a search engine server 102, one or more database servers such as a database server 104, and one or more networks such as a network 106. The system environment 100 further includes one or more user computing devices associated with one or more users such as a user computing device 108 associated with a user 110. Examples of the user computing device 108 may include a smartphone, a tablet computer, a laptop, or any other portable communication device. The search engine server 102 and the user computing device 108 may be configured to communicate with each other over a communication network such as the network 106. The search engine server 102 and the database server 104 may also communicate with each other over the same network 106 or a different network.

The search engine server 102 is a computing device, a software framework, or a combination thereof, that may provide a generalized approach to create the application server implementation. Examples of the search engine server 102 include, but are not limited to, a personal computer, a laptop, or a network of computer systems. The search engine server 102 may be realized through various web-based technologies such as, but not limited to, a Java web-framework, a .NET framework, a PHP (Hypertext Preprocessor) framework, or any other web-application framework. The search engine server 102 may operate on one or more operating systems such as Windows, Android, Unix, Ubuntu, Mac OS, or the like. Various operations of the search engine server 102 may be dedicated to execution of procedures, such as, but are not limited to, programs, routines, or scripts stored in one or more memory units for supporting its applied applications and performing one or more operations.

In an embodiment, the search engine server 102 may be configured to enable or allow the one or more users to perform enhanced content searching in an online manner. The content searching may be performed by the one or more users by means of the Internet search engine that is implemented, supported, and presented by the search engine server 102 on the one or more user computing devices such as the user computing device 108. In an exemplary embodiment, the search engine server 102 may be configured to execute a computer program (i.e., a search engine program) to implement one or more aspects of the search engine. For example, the computer program may create and manage databases and data tables that store data used by the computer program. The computer program may include instructions for the search engine server 102 to execute to implement the methods and processes associated with various aspects of the present disclosure. The computer program may be tangibly embodied on a computer readable medium such as a magnetic disk, a magneto-optical disk, a flash memory, a random-access memory, a read only memory, a programmable read only memory, an erasable programmable read only memory, or the like. The computer program further permits the network users, upon navigating to the search engine web server URL or sites on other web servers or the search application running on the user computing device 108 capable of submitting queries to the search engine server 102 through their browser program or application, to type keyword queries to identify digital content items of interest among the millions of digital content items that are available on the World Wide Web or the database server 104. In an exemplary embodiment, the search engine server 102 may be configured to generate a search result that includes at least one or more relevant digital content items obtained from the World Wide Web or the database server 104. The search engine server 102 may be further configured to generate a list of hypertext links corresponding to the digital content items that contain information relevant to search keywords entered by the user 110 at the user computing device 108. The search engine server 102 may be further configured to transmit or present this search result, in the form of a web page or interface page (hereinafter, may be referred to as a search result page), to the user 110, where it is displayed on a browser or application running on the user computing device 108.

In an embodiment, the search engine server 102 may be configured to integrate the search engine with a search bar. The search bar may be provided for receiving one or more keywords from the one or more users. For example, the search bar may be utilized by the one or more users (such as the user 110) to input or provide the one or more keywords to the search engine server 102 for searching the digital content items. The search engine server 102 may be further configured to process the one or more keywords to identify or select the relevant digital content items from the World Wide Web and/or the database server 104. After processing the one or more keywords, the search engine server 102 may be further configured to generate and present a search result page to the user 110. The search result page may include the relevant digital content items associated with the one or more keywords searched by the user 110. The search result page may further include the search bar along with the one or more keywords therein. The search bar on the search result page may be further integrated with a zoom-in component by the search engine server 102. The zoom-in component is a tool that is integrated with the search bar and is enabled or accessed or selected by the user 110 to further refine or limit or narrow down the search results. In an exemplary embodiment, when enabled or selected or accessed by the user 110, the zoom-in component may be configured to provide an additional search bar. The user 110 may then use the additional search bar to provide one or more additional keywords to the search engine server 102 for further refining or limiting or narrowing down the search results. In this case, the search engine server 102 may further process the one or more additional keywords to refine or limit or narrow down the previous search results obtained based on the one or more previous keywords.

In an embodiment, the search engine server 102 may be further configured to integrate the search engine with a plurality of searching modes. The plurality of searching modes may include at least a value mode (VM), a popularity mode (PM), and an expert mode (EM) for searching the digital content items. Each searching mode, when selected by the one or more users from the plurality of searching modes, may enable the one or more users to perform the related mode of searching the digital content items on the World Wide Web or the database server 104 by means of the search engine. The one or more users may access the search engine by means of the web or mobile application running on their user computing devices.

The value mode may correspond to a mode of searching digital content items on the World Wide Web or the database server 104 based on a value associated with each of the digital content items. For example, when the user 110 searches a keyword in the value mode, the search engine may be configured to retrieve the digital content items that are relevant to the searched keyword and thereafter may present the relevant digital content items to the user 110 based on their values. For example, the relevant digital content items may be retrieved and sorted based on their values and are then presented to the user 110 in either increasing or decreasing order of the values. In an exemplary embodiment, a value of a content item may correspond to a current market value of the content item. The market value of the content item during its lifetime may be defined or determined based on a valuation function by finding and ranking nearest one or more previously processed content items having a plurality of attributes with closest similarity to a plurality of attributes of the content item and then performing weighted averaging of valuation functions associated with the nearest one or more of the previously processed and ranked content items.

The popularity mode may correspond to a mode of searching digital content items on the World Wide Web or the database server 104 based on a current popularity associated with each of the digital content items. For example, when the user 110 searches a keyword in the popularity mode, the search engine may be configured to retrieve the digital content items that are relevant to the searched keyword and thereafter may present the relevant digital content items to the user 110 based on their popularities. For example, the relevant digital content items may be retrieved and sorted based on their popularities and are then presented to the user 110 in either increasing or decreasing order of their popularities. In an exemplary embodiment, the popularity of each content item may be determined based on a count of current views or access of each content item. Here, the content item may have been accessed by the one or more users either freely or by watching one or more advertisements or by purchasing the content item itself. In a specific embodiment, the popularity of each content item may be determined based on the count of current views of each content item by the one or more users who have got the access either by watching the one or more advertisements or by purchasing the content item itself. In another example, the popularity of each content item may be determined based on a relative count of current views of each content item with respect to other related content items. In another example, the popularity of each content item may be determined based on a count of historical views of each content item that had already been viewed or accessed by the one or more users either by watching the one or more advertisements or by purchasing the content item itself in the past. In another example, the popularity of each content item may be determined based on a collective user rating of each content item provided by the one or more users. In another example, the popularity of each content item may be determined based on an access mode (such as accessed by using coins, accessed by watching ads, or free access) associated with each content item. The access mode may be related to the current or historical views of each content item.

The expert mode may correspond to a mode of searching digital content items on the World Wide Web or the database server 104 by one or more subject matter experts on behalf of the one or more users. In this mode, the user 110, who wishes to obtain the preferred or desired digital content items, may hire the one or more subject matter experts on the search engine platform in an online manner. The one or more subject matter experts may be hired by the user 110 by performing a keyword-based searching in the expert mode on the search engine. For example, when the user 110 searches a keyword in the expert mode, the search engine may be configured to retrieve the one or more subject matter experts who are relevant to the searched keyword or subject and thereafter may present a list of the relevant subject matter experts to the user 110. These subject matter experts may be presented in a sorted manner based on at least one of a relevant skill (must be related to the searched keyword), a skill strength, a location, a language, and/or a user rating associated with each subject matter expert. Thereafter, the one or more subject matter experts may be hired by the user 110 to perform the search on behalf of the user 110 when the user 110 agrees to pay one or more service fees to the one or more subject matter experts for availing their searching services. If hired, the one or more hired experts may conduct the search on the search engine on behalf of the user 110 to obtain the preferred digital content items and submit the obtained search results to the user 110. The search results may include the preferred digital content items or the closest match to the preferred digital content items.

In an embodiment, the search engine server 102 may be further configured to integrate the search engine with a channel component that may enable or allow the one or more users (such as the user 110) to create one or more channels. Each channel may correspond to a content group associated with one or more preferred keywords. The content group may then be utilized by the user 110 to directly access the preferred digital content items associated with the one or more preferred keywords without performing the search on the search engine using the one or more preferred keywords. In one example, the channel component may include the one or more channels that have been previously created by the user 110 based on the one or more keywords according to his or her preferences for one or more types of digital content items. In another example, the channel component may include the one or more channels that have been automatically created by the search engine server 102 based on at least one of the user's searching history or the current trending content. In an embodiment, the search engine server 102 may automatically update the one or more channels based on any real time update of the digital content items with respect to the associated preferred or trending keywords. Such automatic update may be automatically communicated to the user 110 by the search engine server 102 in real time.

In an embodiment, the search results for each search conducted on the search engine may include the one or more digital content items in response to the one or more keywords provided or searched by the user 110 on the search engine. Each digital content may be presented along with one or more associated static or dynamic information.

In an embodiment, the search engine server 102 may be further configured to integrate the search engine with a plurality of privacy modes that are displayed or presented along with the search bar on the one or more user computing devices such as the user computing device 108. The plurality of privacy modes may include at least a private mode of conducting a search on the search engine and a public mode of conducting a search on the search engine. The search engine server 102 may be configured to enable or allow the one or more users to set (or change) their privacy before or during the process of conducting a search on the search engine by selecting one of the plurality of privacy modes before or during the process of conducting the search. Based on the set (or changed) privacy mode (i.e., a private or public mode), at least one of the searched keywords and the search results are either kept private or made public. For example, when the search is performed in the private mode by the user 110, the searched keywords and the search results are kept private and are not shared with any other users. However, when the search is performed in the public mode by the user 110, at least one of the searched keywords and the search results are made public and are shared with other users such as those who are following the user 110 on the search engine. In some embodiments, if the user 110 has linked one or more social media profiles with a user account of the search engine, then the search engine server 102 may share at least one of the searched keywords and the search results on the one or more social media platforms of the user 110 when the user 110 has performed the search in the public mode.

In an embodiment, the search engine server 102 may be further configured to integrate the search engine with a read what they read (RWTR) component that includes one or more followings and/or followers of the user 110. The RWTR component may be displayed or presented along with the search bar and the plurality of privacy modes on the one or more user computing devices such as the user computing device 108. The RWTR component may be configured to enable or allow the user 110 to access or read or review at least one of the keywords or the digital content items that were searched and followed (i.e., read or reviewed) by the user's followings on the search engine. These digital content items may be available for the user to read or review only when the user's followings have performed the search in the public mode on the search engine.

In an embodiment, the search engine server 102 may be further configured to integrate the search engine with a search power component that includes a search power of the user 110. The search engine server 102 (or the search power component of the search engine) may be configured to generate the search power of the user 110 based on one or more searching activities performed on the search engine by the user 110. The search power may be represented by a numerical value (i.e., a power value or a proficiency level) that indicates how good the user 110 is in performing the keyword-based search on the search engine. The search engine server 102 may generate the search power based on one or more numerical values (i.e., one or more categorical power values) associated with one or more search categories (such as biology, cricket, chemistry, politics, entertainment, e-commerce, football, celebrity, or the like). The search engine server 102 may identify the one or more search categories based on the one or more keywords used by the user 110 for conducting one or more searches on the search engine. Further, in an embodiment, the search engine server 102 may determine a category power value for each search category based on at least one or more parameters associated with one or more searches related to each search category. In an embodiment, the one or more parameters may be determined based on at least one of:

a type of searching, such as a keyword-based searching, a channel-based searching, or an image-based searching, conducted by the user 110, a count of keywords used by the user 110 for conducting a search, a count of historical searches conducted by the user 110,
a count of pages or content items reviewed by the user 110 during each search,
a count of clicks performed by the user 110 during each search,
an order (such as an increasing or decreasing order) of clicks per page or a defined number of content items, say, per 10 content items,
a user reading time of a clicked content item in comparison to an actual reading time of the same content item,
a frequency of using a zoom-in feature by the user 110 during each search,
a degree of premium purchase by the user 110 during each search,
a degree of free purchase by the user 110 during each search,
a frequency of channel clicking,
a frequency of channel creation,
a frequency of channel refreshing,
a connection of one or more social media to one or more channels,
a keyword search typing, for example, using IPTC at one or more levels,
a frequency of using a privacy mode,
a frequency of switching between privacy modes during each search,
a frequency of reviewing one or more keywords searched by the user's following(s),
a frequency of reviewing one or more content items searched by the user's following(s),
a total time spent by the user 110 on the search engine during each session, or
a total idle time spent by the user 110 on the search engine during each session.

The database server 104 may include suitable logic, circuitry, interfaces, and/or code, executable by the circuitry that may be configured to perform one or more data management and storage operations such as receiving, storing, processing, and transmitting queries, data, content, algorithms, code, or the like. In an embodiment, the database server 104 may be a data management and storage computing device that is communicatively coupled to the search engine server 102 or the user computing device 108 via the network 106 to perform the one or more data management and storage operations.

In an exemplary embodiment, the database server 104 may be configured to manage and store one or more search queries searched by the one or more users on the search engine. The database server 104 may be further configured to manage and store search data. The search data may include information gathered from the Internet. The search data may further include indexed information and URLs for the websites that correspond to the indexed information. The query is used to access the indexed information to produce the URLs of the web sites related to the query. The database server 104 may be further configured to manage and store one or more words (search terms) and their associated classification and synonyms according to a type of speech. The classifications may include that the term is a noun, verb, adjective, or the like. The database server 104 may be further configured to manage and store one or more profiles of the one or more users who are registered on the search engine. Each profile may include information such as a user's name, number, email, preferences, channels, followers, followings, or the like. In some embodiments, each profile may include payment details for one or more types of digital currencies. In some embodiments, each profile may further include currency (or coin) details such as remaining coin balance, spent coins, free coins, or awarded coins. In an exemplary embodiment, the database server 104 may be further configured to manage and store search history of the one or more users. In an exemplary embodiment, the database server 104 may be further configured to manage and store one or more algorithms, rules, code, or the like that are retrieved and executed by the search engine server 102 to perform the one or more searching operations in real time. In an exemplary embodiment, the database server 104 may be further configured to manage and store one or more notifications. In an exemplary embodiment, the database server 104 may be further configured to manage and store channel preferences of the one or more users. In an exemplary embodiment, the database server 104 may be further configured to manage and store privacy preferences of the one or more users. In an exemplary embodiment, the database server 104 may be further configured to manage and store the one or more parameters. In an exemplary embodiment, the database server 104 may be further configured to manage and store the search power of each of the one or more users. In an embodiment, the database server 104 may be further configured to receive a query from the search engine server 102 for retrieval of the stored information. Based on the received query, the database server 104 may communicate the requested information to the search engine server 102. The database server 104 may be implemented by means of a personal computer, a laptop, or a network of computer systems. Examples of the database server 104 may include, but are not limited to, MongoDB, Cassandra, and HBase, or Structured Query Language (SQL) database.

The network 106 may include suitable logic, circuitry, interfaces, and/or code, executable by the circuitry that may be configured to transmit messages and requests between various entities, such as the search engine server 102, the database server 104, and the user computing device 108. Examples of the network 106 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the network 106 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2A:
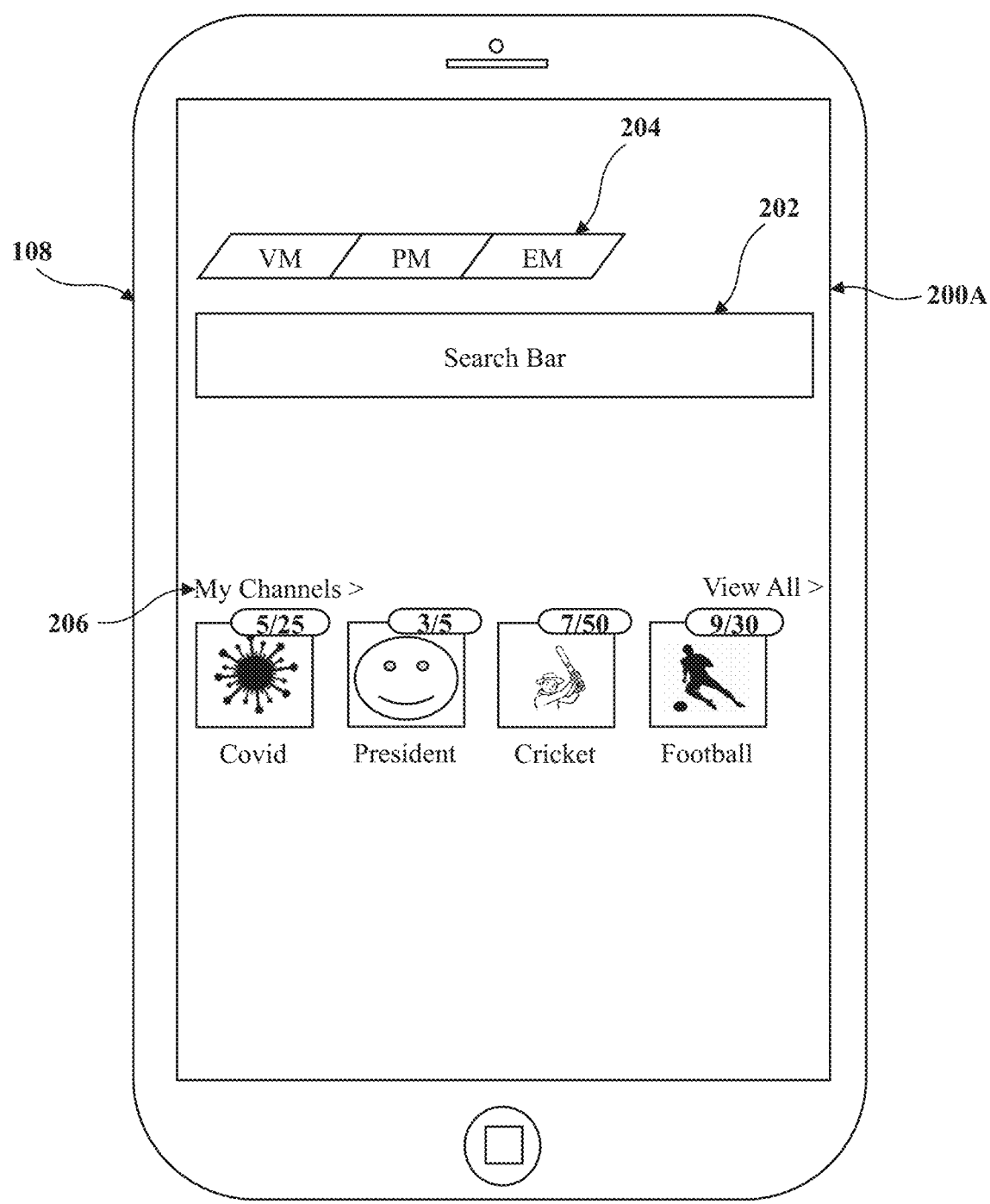
FIG. 2A is a diagram that illustrates a graphical user interface with a search engine page rendered on a user computing device for illustrating searching modes, in accordance with an exemplary embodiment of the present disclosure.

FIG. 2A is a diagram that illustrates a graphical user interface with a search engine page 200A rendered on the user computing device 108 for illustrating the searching modes, in accordance with an exemplary embodiment of the disclosure. In an embodiment, the search engine server 102 may be configured to render the search engine page 200A on the user computing device 108. In one example, the search engine page 200A may be rendered on the user computing device 108 when the user 110 logs into the search engine by using his or her login credentials. After receiving the login credentials from the user 110, the search engine server 102 may be configured to validate the login credentials of the user 110. Post the successful validation of the login credentials of the user 110, the search engine server 102 may render the search engine page 200A on the user computing device 108. As shown, the search engine server 102 may include one or more tools or components of the search engine on the search engine page 200A. These tools or components of the search engine may be utilized by the user 110 to perform one or more searching operations.

In an exemplary embodiment, the search engine page 200A may include the search bar 202. The search bar 202 may be provided for receiving the one or more keywords from the one or more users. For example, the search bar 202 may be utilized by the user 110 to provide one or more keywords to the search engine for searching the digital content items. Based on processing of the one or more keywords, the search engine may present the search result page to the user 110. The search result page may include the relevant digital content items associated with the one or more keywords.

In an exemplary embodiment, the search engine page 200A may further include a searching mode selector 204. The searching mode selector 204 may include the plurality of searching modes that are selectable by the user 110 on the search engine page 200A of the search engine. The plurality of searching modes may include at least the value mode (VM), the popularity mode (PM), and the expert mode (EM) for searching the digital content items. A searching mode, when selected by the user 110 from the plurality of searching modes, may enable the user 110 to perform the searching of the digital content items on the World Wide Web and/or the database server 104 by means of the search engine. In each selected searching mode, the user 110 may provide the one or more keywords to search the relevant or related digital content items. In an embodiment, the value mode may correspond to a mode of searching the digital content items based on the current market values of the digital content items. For example, when the user 110 searches a keyword in the value mode, the search engine may be configured to retrieve the digital content items that are relevant to the searched keyword and thereafter may present the relevant digital content items to the user 110 based on their current market values. For example, the relevant digital content items may be retrieved and sorted based on their current market values and are then presented to the user 110 in either increasing or decreasing order of the current market values. In an embodiment, the popularity mode may correspond to a mode of searching the digital content items based on the current popularity of the digital content items. For example, when the user 110 searches a keyword in the popularity mode, the search engine may be configured to retrieve the digital content items that are relevant to the searched keyword and thereafter may present the relevant digital content items to the user 110 based on their current popularities. For example, the relevant digital content items may be retrieved and sorted based on their popularities and are then presented to the user 110 in either increasing or decreasing order of their current popularities. In an embodiment, the expert mode may correspond to a mode of searching the digital content items by the one or more experts on behalf of the one or more users such as the user 110. Here, the one or more experts may perform the search on behalf of the user 110 when the user 110 searches the one or more experts on the search engine based on the one or more keywords and then hires and agrees to pay one or more service fees to the one or more experts for availing their searching services.

In an exemplary embodiment, the search engine page 200A may further include the channel component 206 ("My Channels" as shown) that may enable or allow the user 110 to create the one or more channels or access the created channels. Each channel may correspond to a content group associated with the one or more preferred keywords. The created channel may then be utilized by the user 110 to directly access the preferred digital content items associated with the one or more preferred keywords without performing the search on the search engine. Each channel may be updated and notified to the user 110 in the real time. Further, each channel may be integrated with an indicator that indicates a count of new updated content (that have not been seen or accessed or reviewed by the user 110) with respect to a count of total content in the channel. For example, for the channel "Covid", the count of new updated content is "5" and the count of total content in the same channel is 25. The channel component 206 is also integrated with a "View All" tab. The user 110 may click on the "View All" tab to view and access all the associated channels and their updates.

Figure 2B:
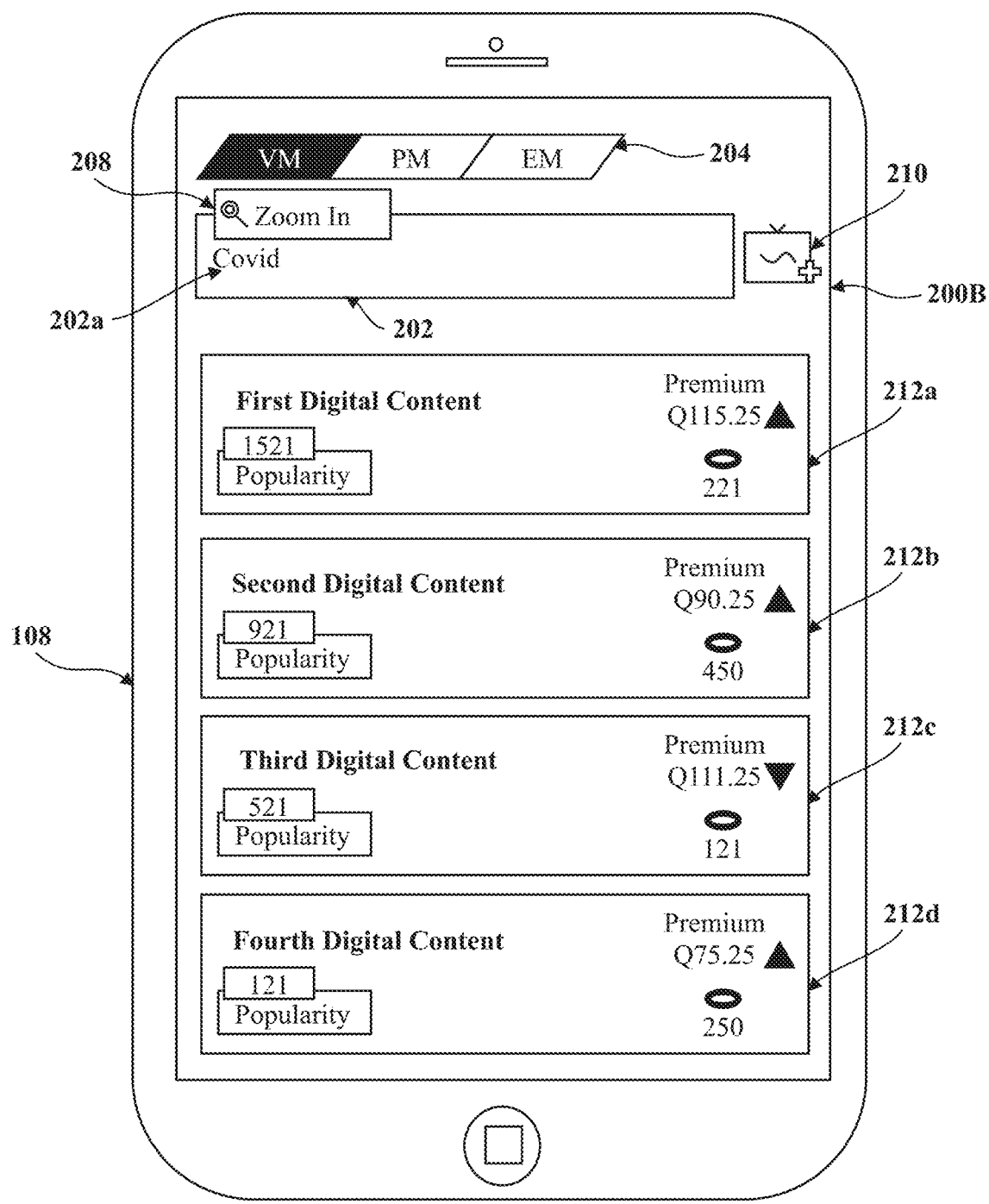
FIG. 2B is a diagram that illustrates a graphical user interface with a search result page rendered on the user computing device, in accordance with an exemplary embodiment of the present disclosure.

FIG. 2B is a diagram that illustrates a graphical user interface with a search result page 200B rendered on the user computing device 108, in accordance with an exemplary embodiment of the disclosure. In an embodiment, the search engine server 102 may be configured to generate and render the search result page 200B on the user computing device 108 in response to the one or more keywords (such as "Covid", as shown by 202a) entered by the user 110 to conduct the search on the search engine. As shown, the search result page 200B includes the search bar 202 with the searched keyword "Covid" and the searching mode selector 204 with the selected value mode. Here, as per the user's preferences, the user 110 may utilize the searching mode selector 204 to switch from one searching mode to another searching mode, for example, from the selected value mode to the popularity mode for searching the same keyword "Covid." In an embodiment, the search result page 200B further includes one or more digital content items, such as a first content item 212a, a second content item 212b, a third content item 212c, and a fourth content item 212d, obtained in response to the searched keyword "Covid" from the World Wide Web and/or the database server 104 by the search engine server 102. In an exemplary embodiment, each digital content item may be associated with a plurality of information such as a content market value and a content popularity index, a current number of views, and so on, as shown in FIG. 2B.

Figure 2C:
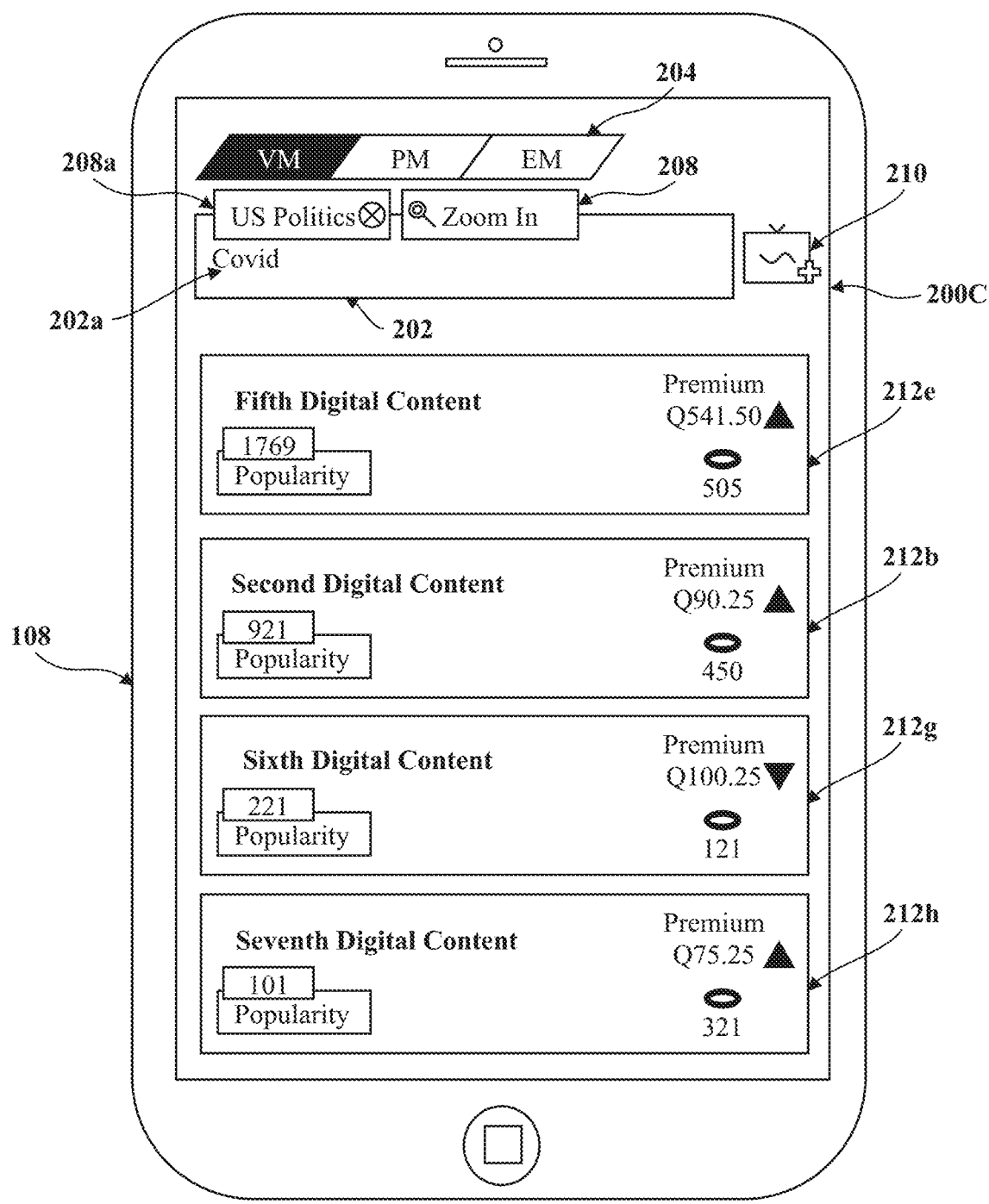
FIG. 2C is a diagram that illustrates a graphical user interface with a search result page rendered on the user computing device, in accordance with another exemplary embodiment of the disclosure.

In an embodiment, the search result page 200B further includes the zoom-in component 208. The zoom-in component 208 may be integrated with the search bar 202 on the search result page by the search engine server 102, as shown. The zoom-in component 208 may be enabled or accessed or selected by the user 110 to further refine or limit or narrow down the search results. In an exemplary embodiment, when the zoom-in component 208 is enabled or selected or accessed by the user 110, the zoom-in component 208 may be configured to provide the additional search bar 208a as shown in FIG. 2C. The user 110 may then utilize the additional search bar 208a to provide one or more additional keywords (such as "US Politics") to the search engine server 102 for further refining or limiting or narrowing down the previous search results.

In an embodiment, the search result page 200B further includes a channel creation component 210. The channel creation component 210 may be accessed by the user 110 to create a channel based on the searched keyword such as the "Covid."

FIG. 2C is a diagram that illustrates a graphical user interface with a search result page 200C rendered on the user computing device 110, in accordance with another exemplary embodiment of the disclosure. In an embodiment, the search engine server 102 may be configured to generate and render the search result page 200C on the user computing device 108 in response to the additional keywords (such as "US Politics") provided by the user 110 in the additional search bar 208a for further refining or limiting or narrowing down the previous search results, for example, as shown in FIG. 2C. As shown, the search result page 200C includes the search bar 202 with the searched keyword "Covid 202a", the additional search bar 208a with the additional keywords "US Politics", and the searching mode selector 204 with the selected value mode. In an embodiment, the search result page 200C further includes one or more digital content items, such as a fifth content item 212e, the second content item 212b, a sixth content item 212g, and a seventh content item 212h, obtained in response to the searched keyword "Covid" along with the additional limitation "US Politics" from the World Wide Web and/or the database server 104 by the search engine server 102.

In an embodiment, the search result page 200C further includes the channel creation component 210. The channel creation component 210 may be accessed by the user 110 to create a channel based on the searched keyword such as the "Covid" and the additional limitation "US Politics."

Figure 3A:
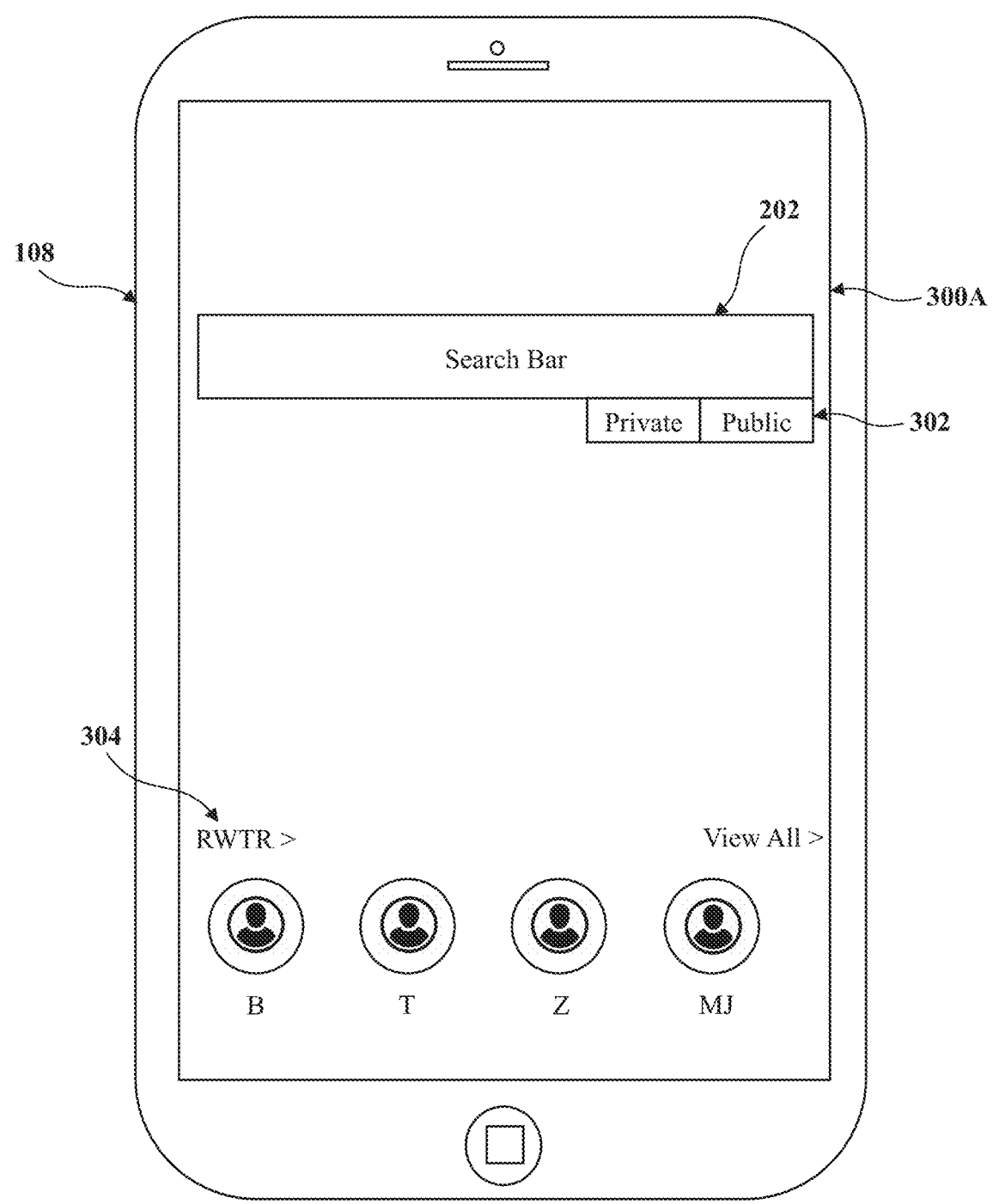
FIG. 3A is a diagram that illustrates a graphical user interface with a search engine page rendered on the user computing device for illustrating privacy modes, in accordance with an exemplary embodiment of the present disclosure.

FIG. 3A is a diagram that illustrates a graphical user interface with a search engine page 300A rendered on the user computing device 108 for illustrating the privacy modes, in accordance with an exemplary embodiment of the present disclosure. In an embodiment, the search engine server 102 may be configured to render the search engine page 300A on the user computing device 108 when the user 110 successfully logs into the search engine by using his or her login credentials to gain access to the search engine. In an embodiment, the search engine server 102 may be further configured to include one or more tools or components of the search engine on the search engine page 300A. These tools or components of the search engine may be implemented and supported by the search engine server 102 and may be utilized by the user 110 to perform one or more searching operations.

In an exemplary embodiment, the search engine page 300A may include a searching tool such as the search bar 202. The search bar 202 may be utilized by the user 110 to provide one or more keywords to the search engine for searching the digital content items. Based on processing of the one or more keywords, the search engine may present a search result page to the user 110. The search result page may include the relevant digital content items associated with the one or more searched keywords.

In an exemplary embodiment, the search engine page 300A may further include a privacy tool such as a privacy mode selector 302. The privacy mode selector 302 may include the plurality of privacy modes that are selectable by the user 110. The plurality of privacy modes may include at least the private mode and the public mode. The search engine server 102 may enable or allow the user 110 to set his or her privacy before or during the process of conducting a search on the search engine. Based on the set privacy mode (i.e., a private or public mode), at least one of the searched keywords and the search results are either kept private or made public. For example, when the search is performed in the private mode by the user 110, the searched keywords and the search results are kept private and are not shared with any other users. However, when the search is performed in the public mode by the user 110, at least one of the searched keywords and the search results are made public and are shared with other users such as those who are following the user 110 on the search engine or social media platform(s). Thus, the selection of one of the privacy modes by the user 110 acts as a user's consent that can be further utilized by the search engine to decide whether the searched keywords and the search results are sharable with others users who are following the user 110 on the search engine.

In an exemplary embodiment, the search engine page 300A may further include the RWTR component 304 that includes at least a list of one or more followings of the user 110. The RWTR component 304 may be displayed or presented along with the search bar 202 and the privacy mode selector 302 on the same search engine page 300A. The RWTR component 304 may be configured to enable or allow the user 110 to read the digital content items that were searched, viewed, read, or reviewed by the user's followings on the search engine. These digital content items may be available for the user to read or review only when the user's followings have performed the search in the public mode on the search engine. In an exemplary embodiment, when the user's following is conducting (or has already conducted) a search on the search engine in the public mode, then the RWTR component 304 may update or notify such actions or proceedings to the user 110 in real time or near real time with a predefined delay. Thereafter, the user 110 may read or review or follow the one or more keywords with or without the digital content items associated with the one or more keywords that were searched (or are currently being searched) by the user's following on the search engine. The RWTR component 304 is also integrated with a "View All" tab. The user 110 may click on the "View All" tab to view the user's followings and access all the associated keywords and content items.

Figure 3B:
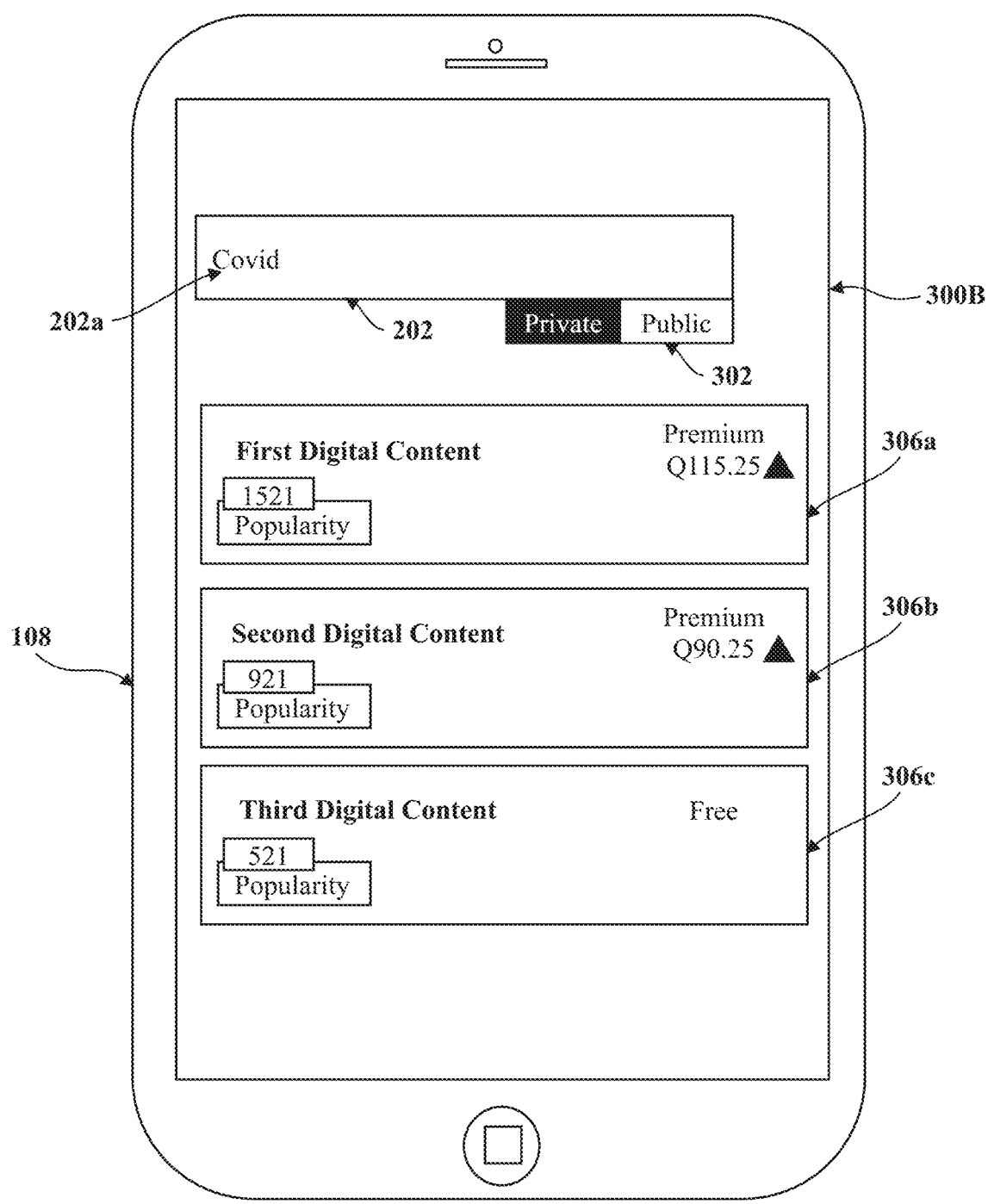
FIG. 3B is a diagram that illustrates a graphical user interface with a search result page rendered on the user computing device, in accordance with another exemplary embodiment of the present disclosure.

FIG. 3B is a diagram that illustrates a graphical user interface with a first search result page 300B rendered on the user computing device 108, in accordance with an exemplary embodiment of the present disclosure. In an embodiment, the search engine server 102 may be configured to generate and render the search result page 300B on the user computing device 108 in response to the one or more keywords (such as "Covid", as shown by 202a) entered or provided by the user 110 to conduct the search on the search engine. As shown, the search result page 300B includes the search bar 202 with the searched keyword "Covid" and the privacy mode selector 302 with the selected private mode. When the search is conducted in the selected private mode as shown in FIG. 3B, the searched keywords and the search results are kept private and are not shared with any other users.

In an embodiment, the search result page 300B further includes a list of one or more digital content items, such as a first content item 306a, a second content item 306b, and a third content item 306c, that have been obtained and presented in response to the searched keyword "Covid" from the World Wide Web and/or the database server 104 by the search engine server 102. In an embodiment, the search engine server 102 may be further configured to determine one or more static or dynamic information for each digital content item and then may present the static or dynamic information along with each digital content item, as shown. For example, the first content item 306a and the second content item 306b have been presented with the associated dynamic information such as a content market value and a content popularity index that are dynamically changing in real time. The first content item 306a and the second content item 306b have also been presented with the associated static information such as a content type (here, premium content) that is static in each time frame. Also, the third content item 306c has been presented with the associated dynamic information such as a content popularity index that is dynamically changing in real time. The third content item 306c has also been presented with the associated static information such as a content market value (here, free content) that is static in each time frame.

Figure 3C:
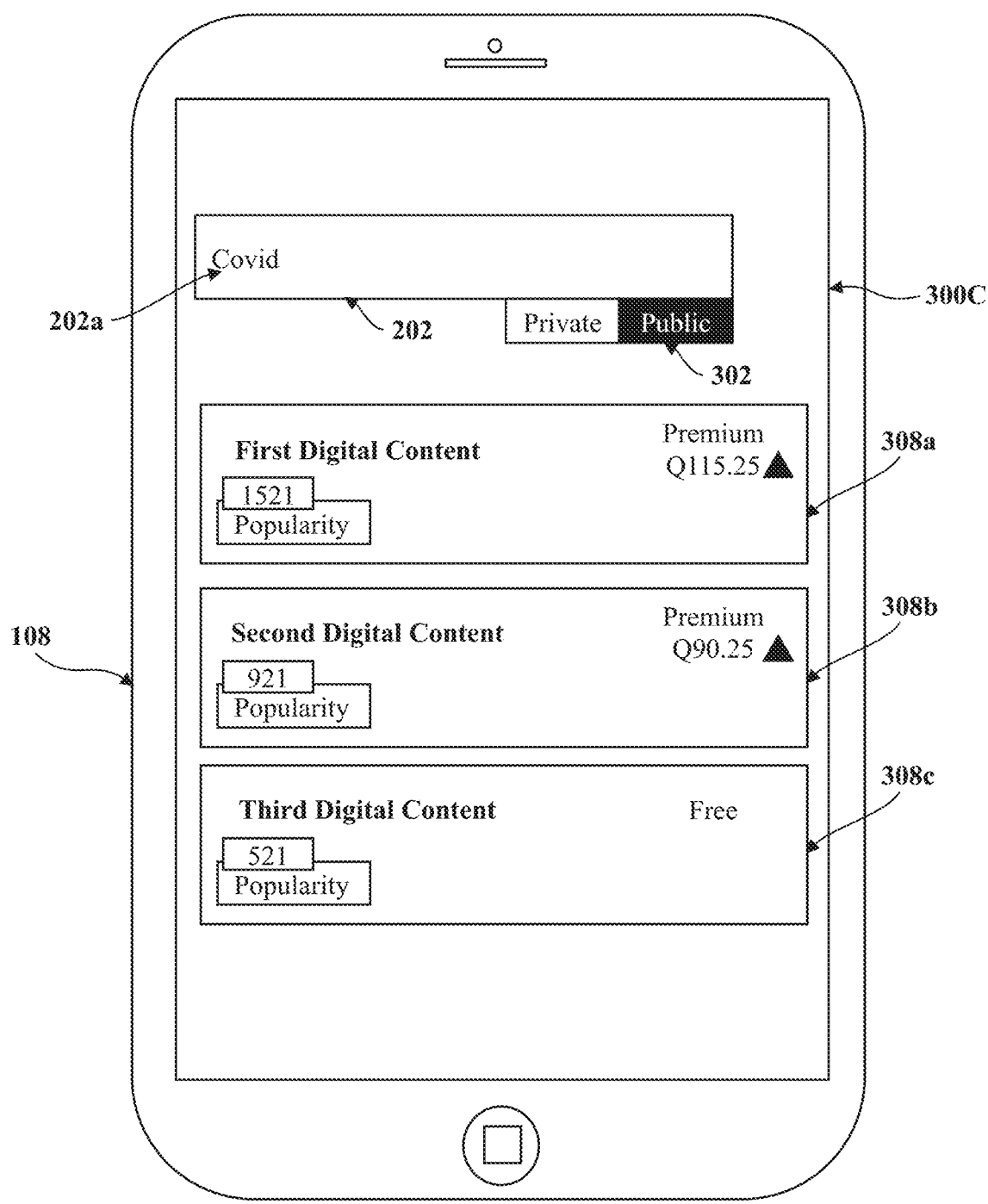
FIG. 3C is a diagram that illustrates a graphical user interface with a search result page rendered on the user computing device, in accordance with another exemplary embodiment of the present disclosure.

FIG. 3C is a diagram that illustrates a graphical user interface with a second search result page 300C rendered on the user computing device 108, in accordance with an exemplary embodiment of the present disclosure. In an embodiment, the search engine server 102 may be configured to generate and render the search result page 300C on the user computing device 108 in response to the one or more keywords (such as "Covid") entered or provided by the user 110 to conduct the search on the search engine. As shown, the search result page 300C includes the search bar 202 with the searched keyword "Covid" and the privacy mode selector 302 with the selected public mode. When the search is conducted in the selected public mode as shown in FIG. 3C, at least one of the searched keywords and the search results are shared with other users who are following the user 110 on the search engine or social media platform(s). Further, as shown, the search result page 300C includes a list of one or more digital content items, such as a first content item 308a, a second content item 308b, and a third content item 308c, that have been obtained and presented in response to the searched keyword "Covid" from the World Wide Web and/or the database server 104 by the search engine server 102. In an embodiment, the search engine server 102 may be further configured to determine one or more static or dynamic information for each digital content item and then may present the static or dynamic information along with each digital content item, as shown.

Figure 4A:
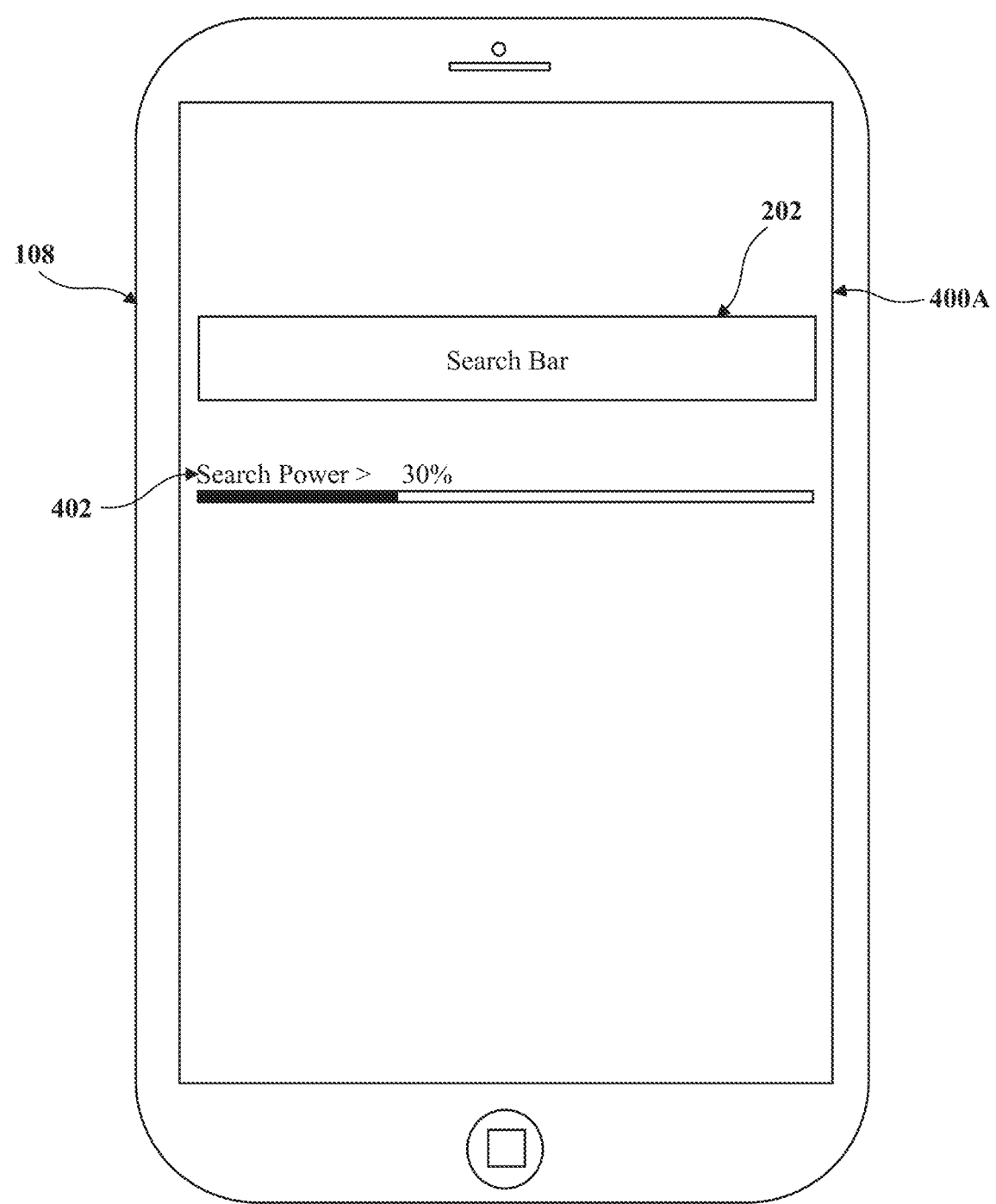
FIG. 4A is a diagram that illustrates a graphical user interface with a search engine page rendered on the user computing device for illustrating search power, in accordance with an exemplary embodiment of the present disclosure.

FIG. 4A is a diagram that illustrates a graphical user interface with a search engine page 400A rendered on the user computing device 108 for illustrating the search power, in accordance with an exemplary embodiment of the present disclosure. In an embodiment, the search engine server 102 may be configured to render the search engine page 400A on the user computing device 108 when the user 110 successfully logs into the search engine by using his or her login credentials. In an embodiment, the search engine server 102 may be further configured to include one or more tools or components of the search engine on the search engine page 400A. These tools or components of the search engine may be utilized by the user 110 to perform one or more searching operations.

In an exemplary embodiment, the search engine page 400A may include the search bar 202. The search bar 202 may be utilized by the user 110 to provide one or more keywords to the search engine for searching the digital content items. Based on processing of the one or more keywords, the search engine may present the search result page to the user 110. The search result page may include the relevant digital content items associated with the one or more keywords.

In an exemplary embodiment, the search engine page 400A may further include the search power component 402. The search power component 402 may be configured to indicate the search power of the user 110. The search power may be represented by a numerical value (i.e., a power value or a proficiency level) that indicates how good the user 110 is in performing the keyword-based search on the search engine. The search engine server 102 may generate the search power of the user 110 based on the one or more numerical values (i.e., the category power values) associated with the one or more search categories. The search engine server 102 may generate the category power value for each search category based on at least the one or more parameters associated with the one or more searches related to each search category. In an exemplary embodiment, the parameters may include at least one of a first parameter (that indicates usage of one or more keywords by the user 110 for conducting the one or more searches related to the search category), a second parameter (that indicates one or more clicks performed by the user 110 on one or more content items associated with the one or more searches), or a third parameter (that indicates a reading time associated with the one or more clicked content items). A person having ordinary skill in the art would understand that a measure of each parameter may be indicated by a numerical value without limiting the scope of the present disclosure. For example, when the user 110 uses the one or more keywords (for example, related to an entertainment category) for conducting a search on the search engine, the search engine server 102 may assign a first value (say, "1") to the first parameter. Further, when the user 110 clicks a content item obtained because of the conducted search, the search engine server 102 may assign a second value (say, "2") to the second parameter. Further, when the user 110 reads or reviews the clicked content item and the reading time is "x" percentage (say, "50%") of a predefined reading time (say, "10 minutes"), the search engine server 102 may assign a third value to the third parameter. The third value may be determined based on x % of the predefined reading time. Thus, for the ongoing example, the third value may be calculated as 5 (=0.5*10). Thereafter, the search engine server 102 may generate the power value for the search based on the one or more values associated with at least one of the first, second, or third parameters. In an exemplary embodiment, the power value for the search (associated with the entertainment category) may be generated as 100*(1+2+5) divided by (1+2+10) i.e., 800/13=61.53. Further, if more than one search was conducted by the user 110 for the entertainment category, for example, 3 searches were conducted and the power values for these 3 searches are 61.53, 40.35, and 51.50, then the category power value for the entertainment category may be determined as an average of these three power values i.e., (61.53+40.35+51.50) divided by 3 i.e., 153.38/3=51.126. Further, if the user 110 has performed the searches in more than one category, for example, sports category and politics category in addition to the entertainment category, then the search engine server 102 may generate the search power for the user 110 based on the category power values of the user 110 in the sports category, the politics category, and the entertainment category. For illustration, consider that the category power values for the user 110 in the sports category and the politics category are 63.451 and 45.864, respectively. In an exemplary embodiment, the search engine server 102 may generate the search power for the user 110 based on an average of the category power values of the user 110 in the sports category, the politics category, and the entertainment category. For example, the search power for the user 110 may be determined as (51.126+63.451+45.864) divided by 3 i.e., 160.441/3=53.480. A person having ordinary skills in the art would understand that the above computations have been shown for the purpose of illustration only and should not be construed as limiting to the scope of the present invention.

Figure 4B:
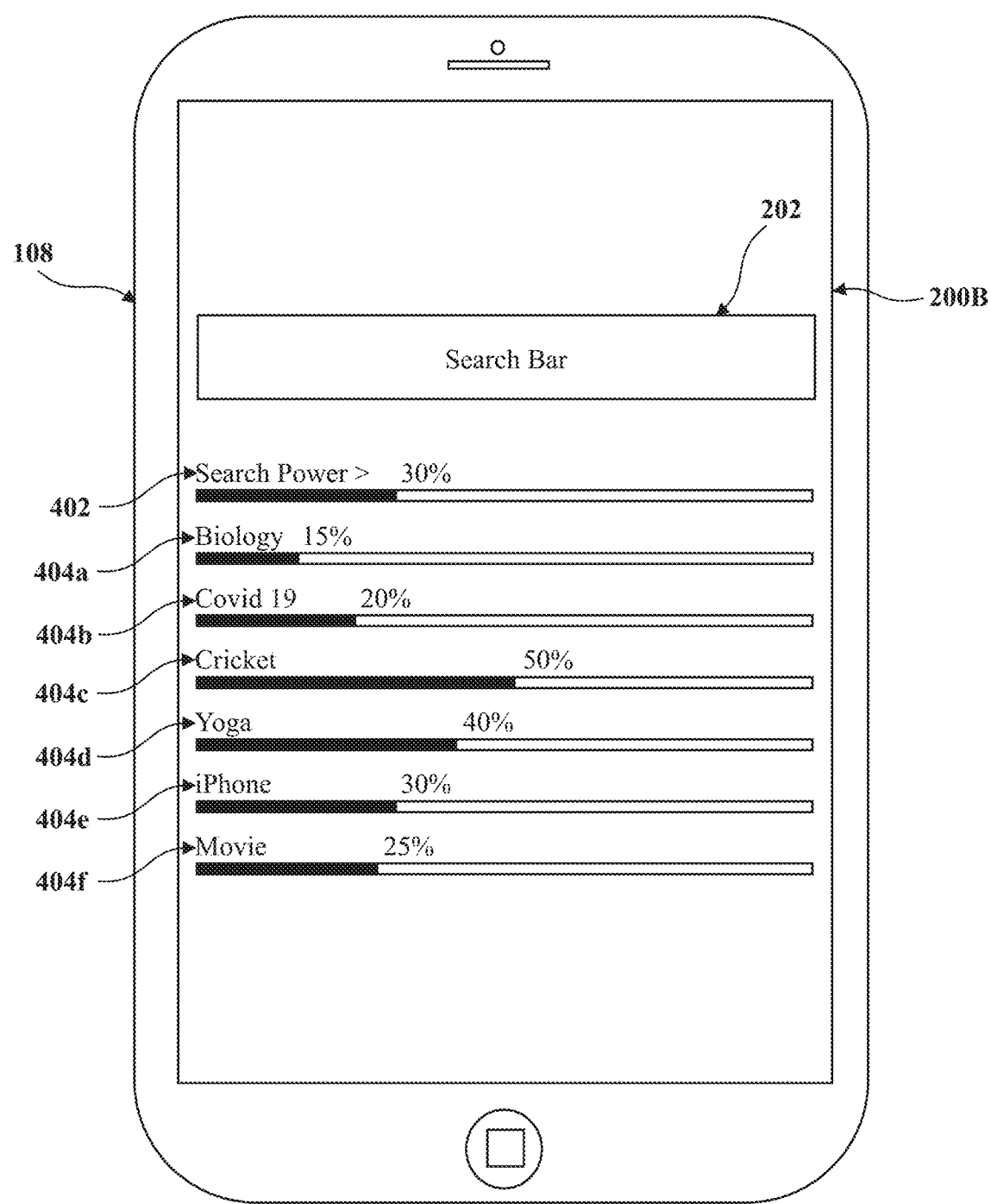
FIG. 4B is a diagram that illustrates a graphical user interface with the search engine page displaying a distributed view of a search power of a user, in accordance with an exemplary embodiment of the present disclosure.

FIG. 4B is a diagram that illustrates a graphical user interface with the search engine page 400B displaying a distributed view of the search power of the user 110, in accordance with an exemplary embodiment of the present disclosure. As shown, the search engine page 400B includes the search bar 202 and the search power component 402, as discussed above. The search engine page 400B specifically illustrates the search power component 402 in a category-wise manner. As shown, the category power value (shown by 404a) of the user 110 in a "Biology" category has been determined as 15%. Further, the category power value (shown by 404b) of the user 110 in a "Covid 19" category has been determined as 20%. Further, the category power value (shown by 404c) of the user 110 in a "Cricket" category has been determined as 50%. Further, the category power value (shown by 404d) of the user 110 in a "Yoga" category has been determined as 40%. Further, the category power value (shown by 404e) of the user 110 in an "iPhone" category has been determined as 30%. Further, the category power value (shown by 404f) of the user 110 in a "Movie" category has been determined as 25%. Further, based on an average of the above category power values, the search engine server 102 may generate the search power for the user 110. For example, as shown, the search power for the user 110 has been generated as 30%. In an embodiment, the user 110 may click on each category to further view distributed power values for various sub-categories within each category.

Figure 5:
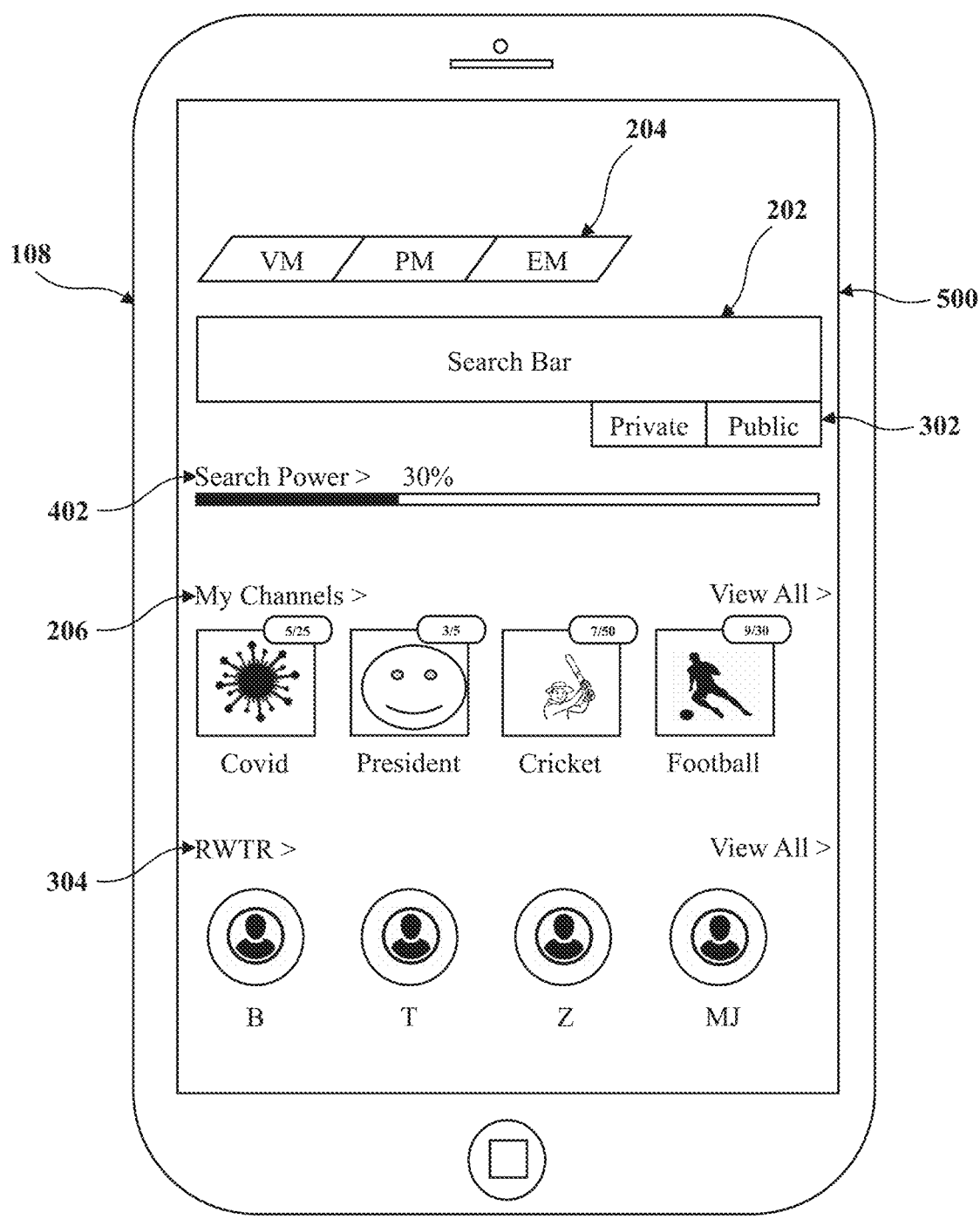
FIG. 5 is a diagram that illustrates a search engine page including at least a search bar, searching modes, a channel component, privacy modes, a RWTR component, and a search power component rendered on the user computing device, in accordance with an exemplary embodiment of the disclosure.

FIG. 5 is a diagram that illustrates a search engine page 500 including at least the search bar 202, the searching modes 204, the channel component 206, the privacy modes 302, the RWTR component 403, and the search power component 402 rendered on the user computing device 108, in accordance with an exemplary embodiment of the disclosure. In an embodiment, the search engine server 102 may be configured to render the search engine page 500 on the user computing device 108 when the user 110 successfully logs into the search engine by using his or her login credentials. In an embodiment, the search bar 202 may be utilized by the user 110 to input or enter one or more keywords for conducting the desired search on the search engine. In an embodiment, the searching modes 204 may be utilized by the user 110 to select one of the plurality of searching modes including the value mode (VM), the popularity mode (PM), and the expert mode (EM) for searching the digital content items. In an embodiment, the channel component 206 may be utilized by the user 110 to access and view the one or more channels corresponding to the one or more content groups. In an embodiment, the privacy modes 302 may be utilized by the user 110 to set one of the plurality of privacy modes including the private and public modes for conducting the desired search on the search engine. In an embodiment, the RWTR component 403 may be utilized by the user 110 to access and view at least one of the keywords and the content items that have been searched by the user's followings on the search engine or social media platform(s). In an embodiment, the search power component 402 may be utilized by the user to view the search power indicating proficiency of the user or other experts in one or more categories of content items. The search power may help the user 110 to assess his or her own proficiency level in conducting search or proficiency levels of other experts whom the user 110 may be willing to hire for conducting a search on the search engine.

Figure 6:
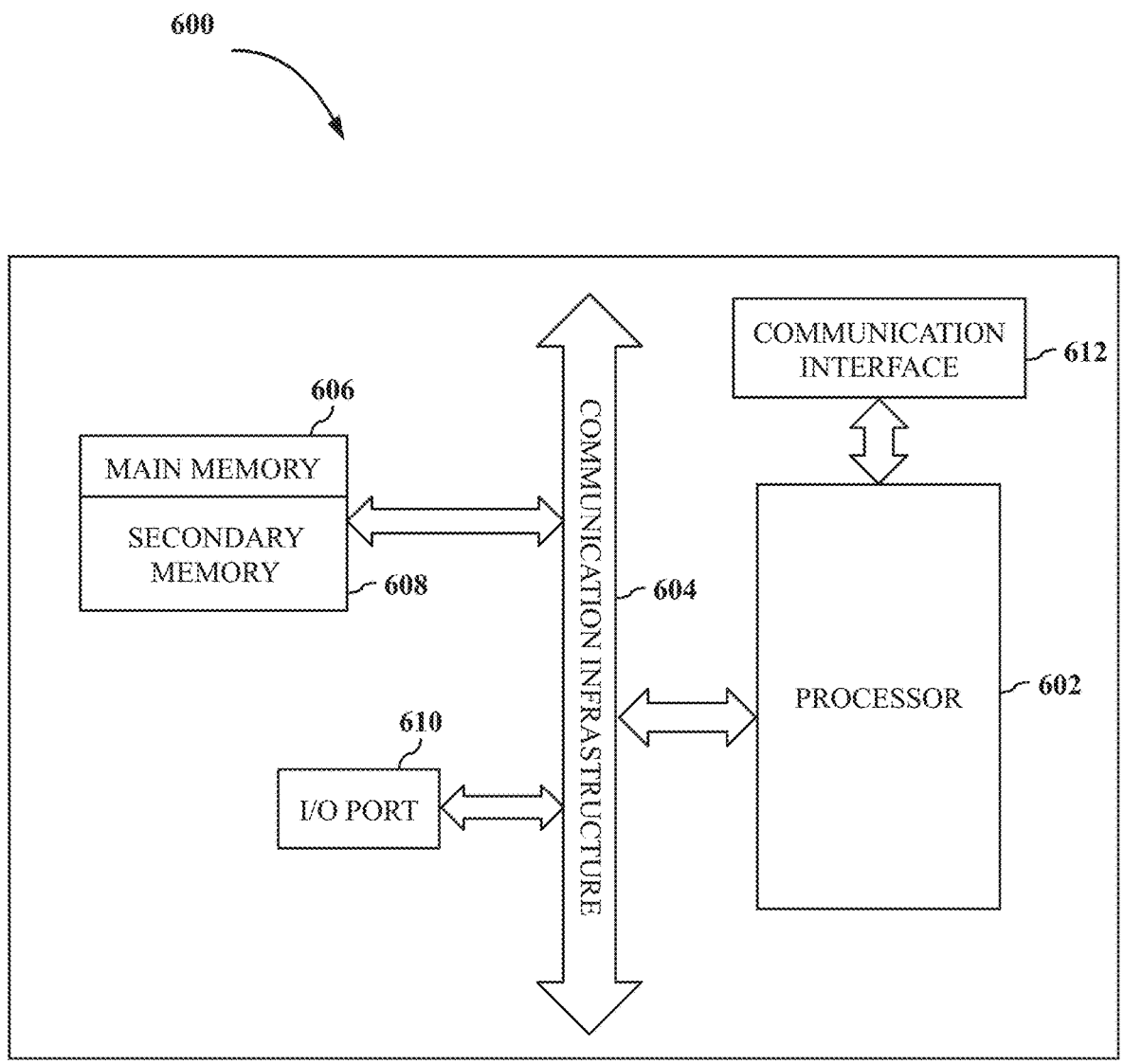
FIG. 6 is a block diagram that illustrates a system architecture of a computer system for performing search engine operations, in accordance with an exemplary embodiment of the disclosure.

FIG. 6 is a block diagram that illustrates a system architecture of a computer system 600 for performing search engine operations, in accordance with an exemplary embodiment of the disclosure. An embodiment of the disclosure, or portions thereof, may be implemented as computer readable code on the computer system 600. In one example, the search engine server 102 or the database server 104 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the searching operations and features as described above in conjunction with FIGS. 2A-2C, 3A-3C, and 4A-4B.

The computer system 600 may include a processor 602 that may be a special purpose or a general-purpose processing device. The processor 602 may be a single processor, multiple processors, or combinations thereof. The processor 602 may have one or more processor "cores." Further, the processor 602 may be coupled to a communication infrastructure 604, such as a bus, a bridge, a message queue, multi-core message-passing scheme, a communication network, a CAN bus, or the like. The computer system 600 may further include a main memory 606 and a secondary memory 608. Examples of the main memory 606 may include RAM, ROM, and the like. The secondary memory 608 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 600 may further include an input/output (I/O) port 610 and a communication interface 612. The I/O port 610 may include various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communication port, and the like. Data transferred via the communication interface 612 may be signals, such as electronic, electromagnetic, optical, or other signals as will be apparent to a person skilled in the art. The signals may travel via a communications channel, such as the CAN bus, which may be configured to transmit the signals to the various devices that are communicatively coupled to the computer system 600. Examples of the communication channel may include a wired, wireless, and/or optical medium such as cable, fiber optics, a phone line, a cellular phone link, a radio frequency link, and the like. The main memory 606 and the secondary memory 608 may refer to non-transitory computer readable mediums that may provide data that enables the computer system 600 to implement the searching operations and features as described above in conjunction with FIGS. 2A-2C, 3A-3C, and 4A-4B.

Figure 7:
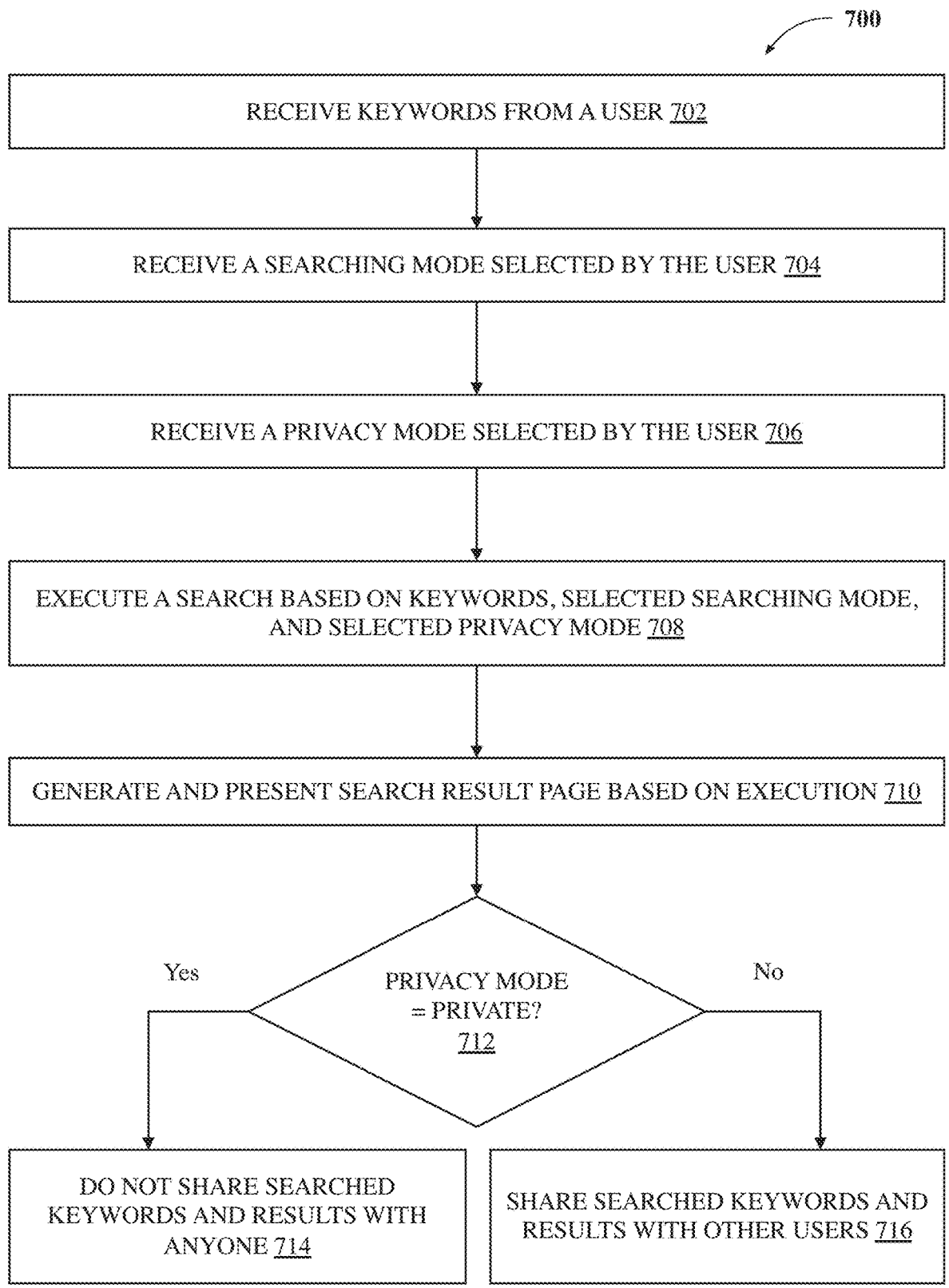
FIG. 7 is a diagram that illustrates a flowchart for performing search engine operations, in accordance with an exemplary embodiment of the disclosure.

FIG. 7 is a diagram that illustrates a flowchart 700 for performing search engine operations, in accordance with an exemplary embodiment of the disclosure. At step 702, the one or more keywords are received from the user 110. In an embodiment, the search engine may be configured to receive the one or more keywords from the user-computing device 108 of the user 110. At step 704, a searching mode selected by the user 110 from the plurality of searching modes is received from the user 110. In an embodiment, the search engine may be configured to receive the selected searching mode from the user-computing device 108 of the user 110. At step 706, a privacy mode selected by the user 110 from the plurality of privacy modes is received from the user 110.

In an embodiment, the search engine may be configured to receive the selected privacy mode from the user-computing device 108 of the user 110. At step 708, the search engine may be configured to execute the search based on the received keywords, the selected searching mode, and the selected privacy mode. At step 710, the search engine may be configured to generate a search result page based on the execution of the search. The search result page may include the search results including the one or more digital content items that are relevant to the searched keywords. Each digital content item may be presented in the form of a weblink that is clickable or interactable by the user for accessing the digital content item over the Internet. Further, the digital content items on the search result page are sorted based on the current market values or the popularity index of each digital content item. At step 712, the search engine performs a check to determine whether the selected privacy mode is equal to the private mode. If the selected privacy mode is equal to the private mode, then step 714 is executed, else step 716 is executed. At step 714, the search engine does not share the searched keywords and results with any other users. At step 716, the search engine shares the searched keywords and results with other users who are following the user 110 on the search engine or other social media platform(s).

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, an Internet search engine that is integrated with various features, tools, or components for enabling a user to perform an easy, enhanced, reliable, and quality content searching. While various exemplary embodiments of the disclosed systems have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A system comprising:
    a processor including a search engine and configured to:
        determine category search power values for a plurality of categories based on searching activities of a user in the plurality of categories, wherein a category power value of a corresponding category indicates a proficiency level of the user in searching for information in the corresponding category and is based on a number of clicks by the user on results of searches in the corresponding category;
        determine a search power value for the user by combining the category search power values of the plurality of categories and present a user interface with the search power value and the plurality of category power values to a computing device of the user, wherein the search power value indicates a search proficiency level of the user across the plurality of categories;
        receive, from the user, one or more keywords in a first search bar of the user interface for conducting a search for digital content items, a selected searching mode from among a plurality of searching modes of the search engine, and a selected privacy mode from among a plurality of privacy modes of the search engine controlling sharing of information of the search, wherein the plurality of searching modes includes modes of searching based on a market value and a popularity of the digital content items;
        execute the search based on the one or more keywords, the selected searching mode, and the selected privacy mode to retrieve the digital content items from one or more of a group of a network and one or more databases;
        determine access to a zoom-in component by the user;
        upon determining an access by the user to the zoom-in component, open a second search bar which is integrated into the first search bar and utilize the second search bar by the user to narrow down the search result generated by the first search bar;
        sort the digital content items in increasing or decreasing order based on the market value of the digital content items; and
        generate a search result page including the sorted digital content items and present the search result page to the computing device of the user.

2. The system of claim 1, wherein the plurality of searching modes includes a value mode that corresponds to a mode of searching the digital content items based on the market value associated with each of the digital content items, wherein the market value of the digital content items is determined based on a valuation function by finding and ranking nearest one or more previously processed digital content items having a plurality of attributes with closest similarity to a plurality of attributes of a digital content item and performing a weighted averaging or valuation functions associated with the nearest one or more previously processed and ranked digital content items.

3. The system of claim 1, wherein the plurality of searching modes includes a popularity mode that corresponds to a mode of searching the digital content items based on the popularity associated with each of the digital content items.

4. The system of claim 1, wherein the plurality of searching modes includes an expert mode that corresponds to a mode of searching the digital content items by one or more subject matter experts on behalf of the user, wherein the one or more subject matter experts are searched and hired by the user on the search engine based on the one or more keywords.

5. The system of claim 1, wherein the search engine includes a channel component including a plurality of channels, wherein each channel corresponds to a content group associated with one or more preferred or trending keywords and one or more channels are created by the search engine based on at least one from a group of a user searching history and current trending keywords or content.

6. The system of claim 5, wherein each channel is utilized by the user to directly access preferred digital content items without searching the preferred or trending keywords.

7. The system of claim 5, wherein each channel is updated and notified to the user in real time.

8. The system of claim 7, wherein each channel is integrated with an indicator that indicates a count of new updated content with respect to a count of total content in the channel.

9. The system of claim 1, wherein the processor is further configured to:
receive, from the user in a second search bar of the user interface, one or more second keywords and conduct a search to refine the digital content items of the search result page based on the one or more second keywords.

10. The system of claim 1, wherein the one or more keywords and related search results are either kept private or made public based on the selected privacy mode of the user.

11. The system of claim 10, wherein the one or more keywords and related search results are kept private and are not shared with any other users, when the search is performed in a private mode by the user.

12. The system of claim 10, wherein the one or more keywords and related search results are shared with other users who are following the user on the search engine, when the search is performed in a public mode by the user.

13. The system of claim 10, wherein the search engine includes a read what they read (RWTR) component that is configured to enable or allow the user to access at least one from a group of search keywords and related search results of the user's followings on the search engine.

14. The system of claim 1, wherein each digital content item is presented along with one or more associated static and dynamic information.

15. The system of claim 14, wherein the static information of each digital content item includes a content type, and wherein the dynamic information of each digital content item includes at least a content market value and a content popularity index that are dynamically changing in real time.

16. A method comprising:
determining, via a processor, category search power values for a plurality of categories based on searching activities of a user in the plurality of categories, wherein a category power value of a corresponding category indicates a proficiency level of the user in searching the corresponding category;
determining, via the processor, a search power value for the user by combining the category search power values of the plurality of categories and presenting a user interface with the search power value to a computing device of the user, wherein the search power value indicates a search proficiency level of the user;
receiving, at the processor from the user, one or more keywords in a first search bar of the user interface for conducting a search for digital content items, a selected searching mode from among a plurality of searching modes of a search engine of the processor, and a selected privacy mode from among a plurality of privacy modes of the search engine controlling sharing of information of the search, wherein the plurality of searching modes includes modes of searching based on a market value and a popularity of the digital content items;
executing, via the processor, the search based on the one or more keywords, the selected searching mode, and the selected privacy mode to retrieve the digital content items from one or more of a group of a network and one or more databases;
determining, via the processor, access to a zoom-in component by the user;
upon determining an access by the user to the zoom-in component, opening a second search bar which is integrated into the first search bar and utilizing the second search bar by the user to narrow down the search result generated by the first search bar;
sorting, via the processor, the digital content items in increasing or decreasing order based on the market value of the digital content items; and
generating, via the processor, a search result page including the digital content items and presenting the search result page to the computing device of the user.

17. The method of claim 16, further comprising:
receiving, at the processor from the user in a second search bar of the user interface, one or more second keywords and conducting a search to refine the digital content items of the search result page based on the one or more second keywords.

18. One or more non-transitory computer readable media having instructions stored thereon, the instructions executable by a processor to cause the processor to:
determine category search power values for a plurality of categories based on searching activities of a user in the plurality of categories, wherein a category power value of a corresponding category indicates a proficiency level of the user in searching the corresponding category;
determine a search power value for the user by combining the category search power values of the plurality of categories and present a user interface with the search power value to a computing device of the user, wherein the search power value indicates a search proficiency level of the user;
receive, from the user, one or more keywords in a first search bar of the user interface for conducting a search for digital content items, a selected searching mode from among a plurality of searching modes of a search engine of the processor, and a selected privacy mode from among a plurality of privacy modes of the search engine controlling sharing of information of the search, wherein the plurality of searching modes includes modes of searching based on a market value and a popularity of the digital content items;
execute the search based on the one or more keywords, the selected searching mode, and the selected privacy mode to retrieve the digital content items from one or more of a group of a network and one or more databases;
determine access to a zoom-in component by the user;
upon determining an access by the user to the zoom-in component, open a second search bar which is integrated into the first search bar and utilize the second search bar by the user to narrow down the search result generated by the first search bar;
sort the digital content items in increasing or decreasing order based on the market value of the digital content items; and
generate a search result page including the digital content items and present the search result page to the computing device of the user.

19. The one or more non-transitory computer readable media of claim 18, wherein the instructions further cause the processor to:

receive, from the user in a second search bar of the user interface, one or more second keywords and conduct a search to refine the digital content items of the search result page based on the one or more second keywords.

\* \* \* \* \*